US011611945B2

(12) United States Patent
Li et al.

(10) Patent No.: US 11,611,945 B2
(45) Date of Patent: *Mar. 21, 2023

(54) SYNCHRONIZATION METHOD, USER EQUIPMENT, AND BASE STATION

(71) Applicant: HUAWEI TECHNOLOGIES CO., LTD., Shenzhen (CN)

(72) Inventors: Chao Li, Beijing (CN); Xingwei Zhang, Lund (SE); Shulan Feng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 79 days.

This patent is subject to a terminal disclaimer.

(21) Appl. No.: 17/035,735

(22) Filed: Sep. 29, 2020

(65) Prior Publication Data
US 2021/0014817 A1 Jan. 14, 2021

Related U.S. Application Data

(63) Continuation of application No. 15/927,098, filed on Mar. 21, 2018, now Pat. No. 10,820,288, which is a
(Continued)

(51) Int. Cl.
H04W 56/00 (2009.01)
H04W 84/22 (2009.01)
(Continued)

(52) U.S. Cl.
CPC ....... H04W 56/0015 (2013.01); H04J 3/0638 (2013.01); H04W 56/00 (2013.01);
(Continued)

(58) Field of Classification Search
CPC .. H04B 7/26; H04B 7/2662; H04J 3/06; H04J 3/0638; H04J 2011/0096; H04W 48/16;
(Continued)

(56) References Cited

U.S. PATENT DOCUMENTS 9,167,544 B2   10/2015  Zheng et al.
9,603,113 B2 *  3/2017  Abedini ............. H04W 56/002
(Continued)

FOREIGN PATENT DOCUMENTS

CN    102132610 A     7/2011
CN    102231893 A    11/2011
(Continued)

OTHER PUBLICATIONS

Fallgren et al., 5G Technologies for the Connected Car, Journal of Latex Class Files, vol. 14, No. 8, Aug. 2015, 8 pages.*
(Continued)

Primary Examiner — Frank Duong
(74) Attorney, Agent, or Firm — James Anderson Harrison

(57) ABSTRACT

Embodiments of the present invention provide a synchronization method, user equipment, and a base station. The synchronization method includes: obtaining, by user equipment, synchronization information, where the synchronization information includes at least one of the following information: synchronization source selection parameter information, synchronization source indication information, or synchronization source priority information; receiving, by the user equipment, a first synchronization signal sent by at least one synchronization source; and determining, by the user equipment, a synchronization reference source according to the synchronization information and the first synchronization information. In the embodiments of the present invention, the synchronization information is obtained, and the synchronization reference source is determined according to the synchronization information and the synchronization signal of the at least one synchronization source, so that synchronization can be implemented.

19 Claims, 9 Drawing Sheets

Related U.S. Application Data continuation of application No. PCT/CN2015/090512, filed on Sep. 24, 2015.

(51) Int. Cl.
*H04J 3/06* (2006.01)
*H04W 84/04* (2009.01)
*H04W 88/02* (2009.01)

(52) U.S. Cl.
CPC ......... *H04W 56/004* (2013.01); *H04W 84/22* (2013.01); *H04W 84/045* (2013.01); *H04W 88/02* (2013.01)

(58) Field of Classification Search
CPC ............. H04W 48/18; H04W 56/0015; H04W 56/004; H04W 56/0045; H04W 76/02; H04W 76/023; H04W 84/047; H04W 84/045; H04W 84/22
See application file for complete search history.

(56) References Cited

U.S. PATENT DOCUMENTS

| | | | |
|---|---|---|---|
| 9,820,111 B2 | 11/2017 | Morita et al. | |
| 9,838,987 B2 | 12/2017 | Sorrentino | |
| 9,860,860 B2 | 1/2018 | Sheng et al. | |
| 10,021,536 B2 | 7/2018 | Morita et al. | |
| 10,091,709 B2* | 10/2018 | Yang | H04W 48/18 |
| 2009/0122782 A1* | 5/2009 | Horn | H04W 56/001 370/350 |
| 2011/0170465 A1* | 7/2011 | Tavildar | H04W 56/0015 370/350 |
| 2013/0077512 A1 | 3/2013 | Chang et al. | |
| 2014/0334478 A1 | 11/2014 | Cheng et al. | |
| 2015/0009875 A1 | 1/2015 | Khoryaev et al. | |
| 2015/0264588 A1 | 9/2015 | Li et al. | |
| 2015/0296469 A1 | 10/2015 | Yoon | |
| 2015/0319723 A1* | 11/2015 | Korhonen | H04J 3/0679 370/350 |
| 2015/0327195 A1 | 11/2015 | Chiu | |
| 2015/0327201 A1 | 11/2015 | He et al. | |
| 2016/0044616 A1* | 2/2016 | Lee | H04W 56/0095 370/350 |
| 2016/0095074 A1* | 3/2016 | Park | H04W 72/10 370/350 |
| 2016/0212721 A1 | 7/2016 | Sheng et al. | |
| 2016/0278030 A1* | 9/2016 | Yi | H04W 16/32 |
| 2016/0374038 A1* | 12/2016 | Wang | H04W 72/0453 |
| 2017/0006568 A1 | 1/2017 | Abedini et al. | |
| 2017/0013578 A1 | 1/2017 | Wei et al. | |
| 2017/0086158 A1 | 3/2017 | Feng et al. | |
| 2017/0142741 A1* | 5/2017 | Kaur | H04W 72/12 |
| 2018/0199298 A1* | 7/2018 | Wakabayashi | H04W 72/1247 |
| 2018/0213498 A1 | 7/2018 | Khoryaev et al. | |
| 2018/0220388 A1 | 8/2018 | Chae et al. | |
| 2018/0352525 A1 | 12/2018 | Li et al. | |

FOREIGN PATENT DOCUMENTS

| | | |
|---|---|---|
| CN | 102625438 A | 8/2012 |
| CN | 103828398 A | 5/2014 |
| CN | 104041151 A | 9/2014 |
| CN | 104641688 A | 5/2015 |
| CN | 104796368 A | 7/2015 |
| CN | 104811925 A | 7/2015 |
| CN | 104322134 B | 12/2020 |
| EP | 3001631 A1 | 3/2016 |
| KR | 20130029355 A | 3/2013 |
| WO | 2014158064 A1 | 10/2014 |
| WO | 2014182342 A1 | 11/2014 |
| WO | 2015065888 A1 | 5/2015 |
| WO | 2015115974 A1 | 8/2015 |
| WO | 2015115977 A1 | 8/2015 |

OTHER PUBLICATIONS

Cannon, On the Design of D2D Synchronization in 3GPP Release-12, IEEE, 6 pages, 2015.

3GPP TS 36.101 V13.0.0 (Jul. 2015),3rd Generation Partnership Project;Technical Specification Group Radio Access Network;Evolved Universal Terrestrial Radio Access (E-UTRA);User Equipment (UE) radio transmission and reception (Release 13), total 699 pages.

Intel Corporation, Discussion on D2D Synchronization, 3GPP TSG RAN WG1 Meeting #75, 7 pages, Nov. 2013.

3GPP TS 36.133 V13.0.0 (Jul. 2015),3rd Generation Partnership Project;Technical Specification Group Radio Access Network;Evolved Universal Terrestrial Radio Access (E-UTRA);Requirements for support of radio resource management(Release 13), total 1411 pages.

CATT, Design of D2DSS and PD2DSCH, 3GPP TSG RAN WG1 Meeting #78, 5 pages, Aug. 2014.

3GPP TS 36.304 V12.5.0 (Jun. 2015),3rd Generation Partnership Project;Technical Specification Group Radio Access Network;Evolved Universal Terrestrial Radio Access (E-UTRA); User Equipment (UE) procedures in idle mode (Release 12), total 38 pages.

CATT, Resource allocation for D2DSS and PD2DSCH, 3GPP TSG-RAN WG1#78b R1-143735, Sep. 27, 2017, 6 pages.

General Dynamics UK Ltd, Remaining details of D2DSS design, 3GPP TSG-RAN WG1#79 R1-144872, Nov. 8, 2014, 5 pages.

Samsung, D2D Synchronization Signal and Channel Design, 3GPP TSG-RAN WG1#77 R1-142120, May 10, 2014, 6 pages.

3GPP TS 36.211 V12.7.0 3rd Generation Partnership Project; Technical Specification Group Radio Access Network; Evolved Universal Terrestrial Radio Access (E-UTRA);Physical channels and modulation(Release 12), Technical Specification, Sep. 2015, 136 pages.

3GPP TS 36.331 V12.7.0 3rd Generation Partnership Project; Technical Specification Group Radio Access Network; Evolved Universal Terrestrial Radio Access (E-UTRA);Radio Resource Control (RRC);Protocol specification(Release 12), Technical Specification, Sep. 2015, 453 pages.

Qualcomm Incorporated, Signal Design and Resource Allocation for D2D Synchronization. 3GPP TSG-RAN WG1 #75 Nov. 11-15, 2013, San Francisco, USA, R1-135317, 6 pages.

\* cited by examiner

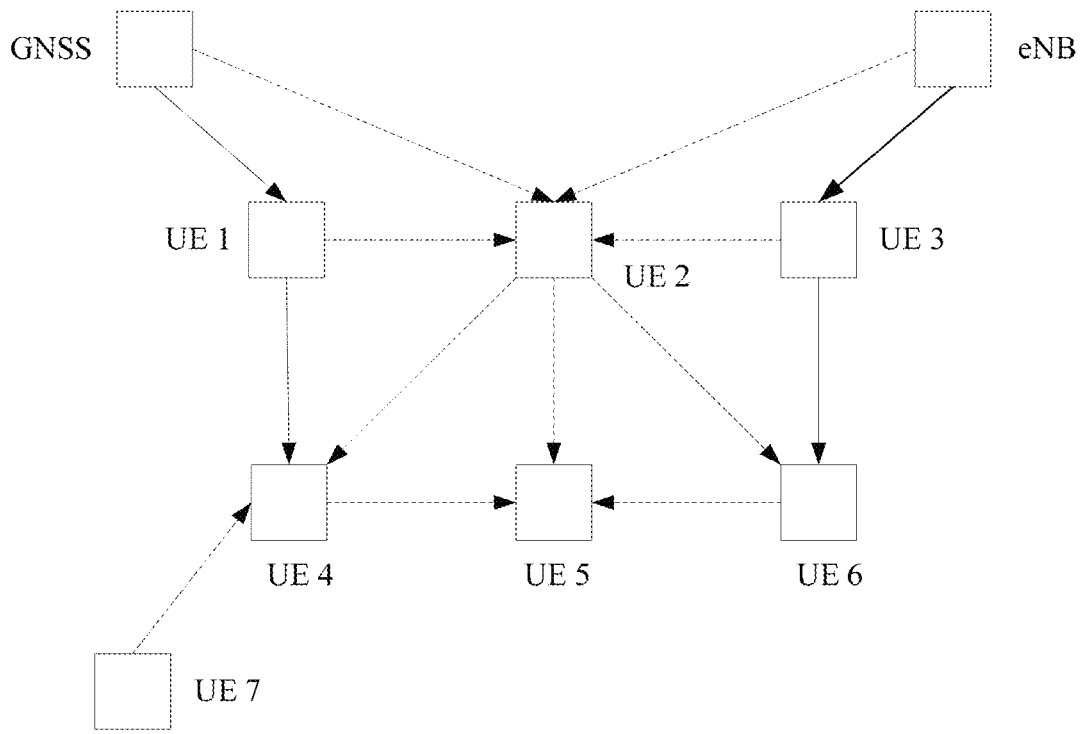

UE obtains synchronization information, where the synchronization information includes at least one of the following information: synchronization source selection parameter information, synchronization source indication information, or synchronization source priority information ~ 310

The UE receives a first synchronization signal sent by at least one synchronization source ~ 320

The UE determines a synchronization reference source according to the synchronization information and the first synchronization signal ~ 330

```
A base station determines synchronization information, where the
synchronization information includes at least one of the following
information: synchronization source selection parameter information,
synchronization source indication information, or synchronization
source priority information
```
⸺ 810

```
The base station sends the synchronization information to UE
```
⸺ 820

```
UE determines a synchronization reference source, where a type
of the synchronization reference source is any one of a GNSS,
a base station, or UE
```
⸺ 910

```
The UE sends a synchronization signal according to the
synchronization reference source, where the synchronization signal
includes a first synchronization signal and/or a second synchronization
signal, and a sequence of the first synchronization signal and/or a
sequence of the second synchronization signal are/is used to indicate
the type of the synchronization reference source
```
⸺ 920

FIG. 9

SYNCHRONIZATION METHOD, USER EQUIPMENT, AND BASE STATION

CROSS-REFERENCE TO RELATED APPLICATIONS

This application is a continuation of U.S. patent application Ser. No. 15/927,098, filed on Mar. 21, 2018, which is a continuation of International Application No. PCT/CN2015/090512, filed on Sep. 24, 2015, All of the afore-mentioned patent applications are hereby incorporated by reference in their entireties.

TECHNICAL FIELD

The present invention relates to the communications field, and in particular, to a synchronization method, user equipment, and a base station.

BACKGROUND

In recent years, with development of intelligent technologies, technologies such as intelligent transportation and unmanned driving attract more attention from academia, industry, and governments. To promote development of the industry, a vehicle-to-vehicle communications technology and standard is a key to resolving the foregoing problem. A basic problem of vehicle-to-vehicle communication is how to implement efficient communication between vehicles in various complex environments. To improve vehicle-to-vehicle communication efficiency, a most basic requirement is that accurate synchronization is implemented between vehicles, so that mutual interference in vehicle-to-vehicle communication can be reduced, and spectral efficiency of vehicle-to-vehicle communication can be improved. As shown in FIG. 1, if four vehicles in a lane can be synchronized with a same synchronization source or a same type of specific-precision synchronization sources, efficiency of communication between the vehicles in the lane can be improved. Therefore, how to determine a synchronization source and implement synchronization is a to-be-resolved problem.

SUMMARY

Embodiments of the present invention provide a synchronization method, user equipment, and a base station, to determine a synchronization reference source according to synchronization information, so that synchronization can be implemented.

According to a first aspect, a synchronization method is provided, including: obtaining, by user equipment, synchronization information, where the synchronization information includes at least one of the following information: synchronization source selection parameter information, synchronization source indication information, or synchronization source priority information; receiving, by the user equipment, a first synchronization signal sent by at least one synchronization source; and determining, by the user equipment, a synchronization reference source according to the synchronization information and the first synchronization signal.

With reference to the first aspect, in a first possible implementation, the determining, by the user equipment, a synchronization reference source according to the synchronization information and the first synchronization signal includes: selecting, by the user equipment from the at least one synchronization source, a synchronization source that satisfies the selection parameter as the synchronization reference source according to the first synchronization signal.

With reference to the first aspect, in a second possible implementation, the synchronization source indication information indicates a first synchronization source, and the determining, by the user equipment, a synchronization reference source according to the synchronization information and the first synchronization signal includes: selecting, by the user equipment, the first synchronization source as the synchronization reference source according to the first synchronization signal.

With reference to the first aspect, in a third possible implementation, the determining, by the user equipment, a synchronization reference source according to the synchronization information and the first synchronization signal includes: selecting, by the user equipment from the at least one synchronization source, a synchronization source with a highest priority as the synchronization reference source according to the priority information and the first synchronization signal.

With reference to the first aspect, in a fourth possible implementation, the synchronization source indication information indicates a first synchronization source, and the determining, by the user equipment, a synchronization reference source according to the synchronization information and the first synchronization signal includes: determining, by the user equipment according to the first synchronization signal, that the at least one synchronization source includes the first synchronization source; and if the first synchronization source satisfies a predefined condition, selecting, by the user equipment, the first synchronization source as the synchronization reference source; or if a signal of the first synchronization source does not satisfy a predefined condition, selecting, by the user equipment from the at least one synchronization source except the first synchronization source, a second synchronization source with a highest priority as the synchronization reference source according to the priority information.

With reference to any one of the first aspect, or the first to the fourth possible implementations, in a fifth possible implementation, the first synchronization signal includes a second synchronization signal and/or a third synchronization signal, and the determining, by the user equipment, a synchronization reference source according to the synchronization information includes: determining, by the user equipment, a type of the at least one synchronization source according to a sequence of the second synchronization signal and/or a sequence of the third synchronization signal; and selecting, by the user equipment, the synchronization reference source according to the synchronization information and the type of the at least one synchronization source.

With reference to the fifth possible implementation, in a sixth possible implementation, a first sequence, a second sequence, and a third sequence of the second synchronization signal are used to indicate different synchronization source types, and the first sequence, the second sequence, and the third sequence are different from each other; or the second synchronization signal occupies a first symbol and a second symbol, and multiple combinations of a sequence used by the first symbol or a sequence used by the second symbol are used to indicate different synchronization source types; or a sequence set of the third synchronization signal includes multiple sequence subsets, and the multiple sequence subsets are used to indicate different synchronization source types; or the third synchronization signal occupies a third symbol and a fourth symbol, and multiple combinations of a sequence used by the third symbol or a sequence used by the fourth symbol are used to indicate different synchronization source types; or the second synchronization signal occupies a first symbol and a second symbol, the third synchronization signal occupies a third symbol and a fourth symbol, and multiple combinations of a sequence used by the first symbol, a sequence used by the second symbol, a sequence used by the third symbol, or a sequence used by the fourth symbol are used to indicate different synchronization source types.

With reference to any one of the first aspect, or the first to the fourth possible implementations, in a seventh possible implementation, the method further includes: receiving, by the user equipment, first control information sent by the at least one synchronization source; and the determining, by the user equipment, a synchronization reference source according to the synchronization information and the first synchronization signal includes: determining, by the user equipment, a type of the at least one synchronization source according to the first control information; and determining, by the user equipment, the synchronization reference source according to the synchronization information, the first synchronization signal, and the type of the at least one synchronization source.

With reference to any one of the first aspect, or the first to the sixth possible implementations, in an eighth possible implementation, the method further includes: receiving, by the user equipment, first control information sent by the at least one synchronization source, where the first control information includes at least one of the following information: auxiliary indication information of a synchronization source type, indication information of a synchronization signal sending cycle, indication information indicating whether a synchronization signal is sent, indication information indicating whether a synchronization signal is valid, indication information of a time-frequency location at which a synchronization signal is sent, or indication information of a hop count of a synchronization source.

With reference to the seventh possible implementation, in a ninth possible implementation, the first synchronization signal includes a second synchronization signal and/or a third synchronization signal, and the determining, by the user equipment, a type of the at least one synchronization source according to the first control information includes: determining, by the user equipment, the type of the at least one synchronization source according to a sequence of the second synchronization signal and/or a sequence of the third synchronization signal, and the first control information.

With reference to any one of the first aspect or the foregoing possible implementations, in a tenth possible implementation, the obtaining, by a receive end, synchronization information includes: receiving, by the user equipment, the synchronization information sent by a base station.

With reference to the tenth possible implementation, in an eleventh possible implementation, before the user equipment receives the synchronization information, the method further includes: sending, by the user equipment, information about the at least one synchronization source to the base station, so that the base station determines the synchronization information according to the information about the at least one synchronization source.

With reference to any one of the first aspect or the foregoing possible implementations, in a twelfth possible implementation, the method further includes: sending, by the user equipment, a fourth synchronization signal and/or second control information according to the synchronization reference source, where the fourth synchronization signal and/or the second control information are/indicates a type of the synchronization reference source.

With reference to any one of the first aspect or the foregoing possible implementations, in a thirteenth possible implementation, the method further includes: determining, by the user equipment, a timing offset between a timing reference of the synchronization reference source and a timing reference of a synchronization reference source in another link; and performing, by the user equipment, communication according to the timing reference of the synchronization reference source and the timing offset.

With reference to the thirteenth possible implementation, in a fourteenth possible implementation, the determining, by the user equipment, a timing offset between a timing reference of the synchronization reference source and a timing reference of a synchronization reference source in another link includes: receiving, by the user equipment, timing offset indication information sent by the base station, where the timing offset indication indicates the timing offset; and determining, by the user equipment, the timing offset according to the timing offset indication information.

With reference to the thirteenth possible implementation, in a fifteenth possible implementation, the determining, by the user equipment, a timing offset between a timing reference of the synchronization reference source and a timing reference of a synchronization reference source in another link includes: obtaining, by the user equipment, the timing reference of the synchronization reference source in the another link; and determining, by the user equipment, the timing offset according to the timing reference of the synchronization reference source and the timing reference of the synchronization reference source in the another link.

According to a second aspect, a synchronization method is provided, including: determining, by a base station, synchronization information, where the synchronization information includes at least one of the following information: synchronization source selection parameter information, synchronization source indication information, or synchronization source priority information; and sending, by the base station, the synchronization information to user equipment.

With reference to the second aspect, in a first possible implementation of the second aspect, the method further includes: sending, by the base station, control information to the user equipment, where the control information indicates a type and/or an identifier of the synchronization reference source.

With reference to the second aspect, in a second possible implementation of the second aspect, the method further includes: sending, by the base station, control information to the user equipment, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

With reference to any one of the second aspect, or the first or the second possible implementation of the second aspect, in a third possible implementation of the second aspect, the determining, by a base station, synchronization information includes: receiving, by the base station, information about at least one synchronization source, where the information is sent by the user equipment; and determining, by the base station, the synchronization information according to the information about the at least one synchronization source.

With reference to any one of the second aspect or the foregoing possible implementations of the second aspect, in a fourth possible implementation of the second aspect, the method further includes: sending, by the base station, timing offset indication information to the user equipment, where the timing offset indication information indicates a timing offset between a timing reference of the synchronization reference source of the user equipment and a timing reference of a synchronization reference source in another link.

According to a third aspect, a synchronization method is provided, including: determining, by user equipment, a synchronization reference source, where a type of the synchronization reference source is any one of a global navigation satellite system, a base station, or user equipment; and sending, by the user equipment, a synchronization signal according to the synchronization reference source, where the synchronization signal includes a first synchronization signal and/or a second synchronization signal, and a sequence of the first synchronization signal and/or a sequence of the second synchronization signal are/indicates the type of the synchronization reference source.

With reference to the third aspect, in a first possible implementation of the third aspect, at least one sequence of the first synchronization signal indicates the type of the synchronization reference source; or the first synchronization signal occupies a first symbol and a second symbol, and at least one combination of a sequence used by the first symbol or a sequence used by the second symbol indicates the type of the synchronization reference source; or a sequence set of the second synchronization signal includes at least two sequence subsets, and at least one of the at least two sequence subsets indicates the type of the synchronization reference source; or the second synchronization signal includes a third symbol and a fourth symbol, and at least one combination of a sequence used by the third symbol or a sequence used by the fourth symbol indicates the type of the synchronization reference source; or the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

With reference to the third aspect or the first possible implementation of the third aspect, in a second possible implementation of the third aspect, the method further includes: sending, by the user equipment, control information, where the sequence of the first synchronization signal and/or the sequence of the second synchronization signal, and the control information are used to indicate the type of the synchronization reference source.

With reference to the third aspect or the first possible implementation of the third aspect, in a third possible implementation of the third aspect, the method further includes: sending, by the user equipment, control information, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

According to a fourth aspect, user equipment is provided, including: an obtaining unit, configured to obtain synchronization information, where the synchronization information includes at least one of the following information: synchronization source selection parameter information, synchronization source indication information, or synchronization source priority information; a transceiver unit, configured to receive a first synchronization signal of at least one synchronization source; and a determining unit, configured to determine a synchronization reference source according to the synchronization information obtained by the obtaining unit and the first synchronization signal received by the transceiver unit.

With reference to the fourth aspect, in a first possible implementation of the fourth aspect, the determining unit is specifically configured to select, from the at least one synchronization source, a synchronization source that satisfies the selection parameter as the synchronization reference source according to the first synchronization signal.

With reference to the fourth aspect, in a second possible implementation of the fourth aspect, the synchronization source indication information indicates a first synchronization source, and the determining unit is specifically configured to select the first synchronization source as the synchronization reference source according to the first synchronization signal.

With reference to the fourth aspect, in a third possible implementation of the fourth aspect, the determining unit is specifically configured to select, from the at least one synchronization source, a synchronization source with a highest priority as the synchronization reference source according to the priority information and the first synchronization signal.

With reference to the fourth aspect, in a fourth possible implementation of the fourth aspect, the synchronization source indication information indicates a first synchronization source, and the determining unit is specifically configured to: determine, according to the first synchronization signal, that the at least one synchronization source includes the first synchronization source; and if the first synchronization source satisfies a predefined condition, select the first synchronization source as the synchronization reference source; or if a signal of the first synchronization source does not satisfy a predefined condition, select, from the at least one synchronization source except the first synchronization source, a second synchronization source with a highest priority as the synchronization reference source according to the priority information.

With reference to any one of the fourth aspect, or the first to the fourth possible implementations of the fourth aspect, in a fifth possible implementation of the fourth aspect, the first synchronization signal includes a second synchronization signal and/or a third synchronization signal, and the determining unit is specifically configured to: determine a type of the at least one synchronization source according to a sequence of the second synchronization signal and/or a sequence of the third synchronization signal; and select the synchronization reference source according to the synchronization information and the type of the at least one synchronization source.

With reference to the fifth possible implementation of the fourth aspect, in a sixth possible implementation of the fourth aspect, a first sequence, a second sequence, and a third sequence of the second synchronization signal are used to indicate different synchronization source types, and the first sequence, the second sequence, and the third sequence are different from each other; or the second synchronization signal occupies a first symbol and a second symbol, and multiple combinations of a sequence used by the first symbol or a sequence used by the second symbol are used to indicate different synchronization source types; or a sequence set of the third synchronization signal includes multiple sequence subsets, and the multiple sequence subsets are used to indicate different synchronization source types; or the third synchronization signal occupies a third symbol and a fourth symbol, and multiple combinations of a sequence used by the third symbol or a sequence used by the fourth symbol are used to indicate different synchronization source types; or the second synchronization signal occupies a first symbol and a second symbol, the third synchronization signal occupies a third symbol and a fourth symbol, and multiple combinations of a sequence used by the first symbol, a sequence used by the second symbol, a sequence used by the third symbol, or a sequence used by the fourth symbol are used to indicate different synchronization source types.

With reference to any one of the fourth aspect, or the first to the fourth possible implementations of the fourth aspect, in a seventh possible implementation of the fourth aspect, the transceiver unit is further configured to receive first control information sent by the at least one synchronization source; and the determining unit is specifically configured to: determine a type of the at least one synchronization source according to the first control information; and determine the synchronization reference source according to the synchronization information, the first synchronization signal, and the type of the at least one synchronization source.

With reference to any one of the fourth aspect, or the first to the sixth possible implementations of the fourth aspect, in an eighth possible implementation of the fourth aspect, the transceiver unit is further configured to receive first control information sent by the at least one synchronization source, where the first control information includes at least one of the following information: auxiliary indication information of a synchronization source type, indication information of a synchronization signal sending cycle, indication information indicating whether a synchronization signal is sent, indication information indicating whether a synchronization signal is valid, indication information of a time-frequency location at which a synchronization signal is sent, or indication information of a hop count of a synchronization source.

With reference to the seventh possible implementation of the fourth aspect, in a ninth possible implementation of the fourth aspect, the first synchronization signal includes a second synchronization signal and/or a third synchronization signal, and the determining unit is specifically configured to determine the type of the at least one synchronization source according to a sequence of the second synchronization signal and/or a sequence of the third synchronization signal, and the first control information.

With reference to any one of the fourth aspect or the foregoing possible implementations of the fourth aspect, in a tenth possible implementation of the fourth aspect, the obtaining unit is specifically configured to receive the synchronization information sent by a base station.

With reference to the tenth possible implementation of the fourth aspect, in an eleventh possible implementation of the fourth aspect, the transceiver unit is further configured to: before the obtaining unit receives the synchronization information, send information about the at least one synchronization source to the base station, so that the base station determines the synchronization information according to the information about the at least one synchronization source.

With reference to any one of the fourth aspect or the foregoing possible implementations of the fourth aspect, in a twelfth possible implementation of the fourth aspect, the transceiver unit is further configured to send a fourth synchronization signal and/or second control information according to the synchronization reference source, where the fourth synchronization signal and/or the second control information are/indicates a type of the synchronization reference source.

With reference to any one of the fourth aspect or the foregoing possible implementations of the fourth aspect, in a thirteenth possible implementation of the fourth aspect, the determining unit is further configured to determine a timing offset between a timing reference of the synchronization reference source and a timing reference of a synchronization reference source in another link; and the transceiver unit is further configured to perform communication according to the timing reference of the synchronization reference source and the timing offset determined by the determining unit.

With reference to the thirteenth possible implementation of the fourth aspect, in a fourteenth possible implementation of the fourth aspect, the transceiver unit is further configured to receive timing offset indication information sent by the base station, where the timing offset indication indicates the timing offset; and the determining unit is specifically configured to determine the timing offset according to the timing offset indication information received by the transceiver unit.

With reference to the thirteenth possible implementation of the fourth aspect, in a fifteenth possible implementation of the fourth aspect, the obtaining unit is further configured to obtain the timing reference of the synchronization reference source in the another link; and the determining unit is specifically configured to determine the timing offset according to the timing reference of the synchronization reference source and the timing reference of the synchronization reference source in the another link.

According to a fifth aspect, a base station is provided, including: a determining unit, configured to determine synchronization information, where the synchronization information includes at least one of the following information: synchronization source selection parameter information, synchronization source indication information, or synchronization source priority information; and a sending unit, configured to send the synchronization information to user equipment.

With reference to the fifth aspect, in a first possible implementation of the fifth aspect, the sending unit is further configured to send control information to the user equipment, where the control information indicates a type and/or an identifier of the synchronization reference source.

With reference to the fifth aspect, in a second possible implementation of the fifth aspect, the base station further includes: sending, by the base station, control information to the user equipment, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

With reference to any one of the fifth aspect, or the first or the second possible implementation of the fifth aspect, in a third possible implementation of the fifth aspect, the base station further includes a receiving unit, configured to: before the sending unit sends the synchronization information to the user equipment, receive information about at least one synchronization source, where the information is sent by the user equipment, where the determining unit is specifically configured to determine the synchronization information according to the information about the at least one synchronization source received by the receiving unit.

With reference to any one of the fifth aspect or the foregoing possible implementations of the fifth aspect, in a fourth possible implementation of the fifth aspect, the sending unit is further configured to send timing offset indication information to the user equipment, where the timing offset indication information indicates a timing offset between a timing reference of the synchronization reference source of the user equipment and a timing reference of a synchronization reference source in another link.

According to a sixth aspect, user equipment is provided, including: a determining unit, configured to determine a synchronization reference source, where a type of the synchronization reference source is any one of a global navigation satellite system, a base station, or user equipment; and a sending unit, configured to send a synchronization signal according to the synchronization reference source, where the synchronization signal includes a first synchronization signal and/or a second synchronization signal, and a sequence of the first synchronization signal and/or a sequence of the second synchronization signal are/indicates the type of the synchronization reference source.

With reference to the sixth aspect, in a first possible implementation of the sixth aspect, at least one sequence of the first synchronization signal indicates the type of the synchronization reference source; or the first synchronization signal occupies a first symbol and a second symbol, and at least one combination of a sequence used by the first symbol or a sequence used by the second symbol indicates the type of the synchronization reference source; or a sequence set of the second synchronization signal includes at least two sequence subsets, and at least one of the at least two sequence subsets indicates the type of the synchronization reference source; or the second synchronization signal includes a third symbol and a fourth symbol, and at least one combination of a sequence used by the third symbol or a sequence used by the fourth symbol indicates the type of the synchronization reference source; or the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

With reference to the sixth aspect or the first possible implementation of the sixth aspect, in a second possible implementation of the sixth aspect, the sending unit is further configured to send control information, where the sequence of the first synchronization signal and/or the sequence of the second synchronization signal, and the control information are used to indicate the type of the synchronization reference source.

With reference to the sixth aspect or the first possible implementation of the sixth aspect, in a third possible implementation of the sixth aspect, the sending unit is further configured to send control information, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

Based on the foregoing technical solutions, the synchronization information is obtained, and the synchronization reference source is determined according to the synchronization information and the synchronization signal sent by the at least one synchronization source, so that synchronization can be implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2B is a schematic diagram of another system architecture according to an embodiment of the present invention;

FIG. 3 is a schematic flowchart of a synchronization method according to an embodiment of the present invention;

FIG. 8 is a schematic flowchart of a synchronization method according to still another embodiment of the present invention;

FIG. 9 is a schematic flowchart of a synchronization method according to yet another embodiment of the present invention;

DESCRIPTION OF EMBODIMENTS

Figure 1:
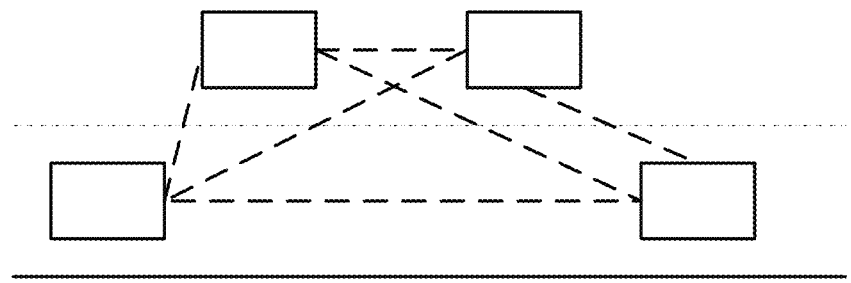
FIG. 1 is a schematic diagram of vehicle-to-vehicle communication.

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In an Internet of Vehicles system for vehicle-to-vehicle communication, a synchronization source may be an evolved NodeB (eNB), or may be a global navigation satellite system (GNSS), or may be user equipment (UE).

In the embodiments of the present invention, user equipment (UE) includes but is not limited to an in-vehicle device, a mobile station (MS), a mobile terminal, a mobile telephone, a handset, or a portable device. Alternatively, UE may be a roadside unit (RSU) that has an in-vehicle device function.

A base station may be a base transceiver station (BTS) in GSM or CDMA, or may be a NodeB (NB) in WCDMA, or may be an evolved NodeB (eNB) in LTE. This is not limited in the embodiments of the present invention. Alternatively, a base station may be an RSU that has a base station function, or a base station may be referred to as a network. This is not limited in the present invention. In the present invention, a base station or an eNB is used as an example for description.

For ease of description, UE and an eNB are used as examples for description in the embodiments of the present invention.

The following describes technical terms in the embodiments of the present invention:

Global navigation satellite system (GNSS): including navigation satellite systems provided by countries and regions, for example, the Chinese BeiDou Navigation Satellite System, the American GPS, the European Galileo positioning system, and the Russian GLONASS.

Synchronization source: a synchronization source with which a synchronous receiver is directly synchronized, for example, a GNSS, an eNB, or UE. The GNSS, the eNB, and the UE may be considered as different external reference sources or independent reference sources.

Synchronization reference source or timing source: a type of a synchronization source or timing used as a reference when UE sends out a synchronization signal, including a GNSS, an eNB, or UE. In this case, the reference source may be considered as a dependent reference source, except that the type of the synchronization source that is used as a reference, and/or a forwarding hop count are/is different when the UE sends out the synchronization signal.

Synchronization signal: Features of the synchronization signal vary with synchronization sources. When a synchronization source is an eNB, the synchronization signal is one or more of downlink physical signals sent by the eNB. When a synchronization source is UE, the synchronization signal is a signal that is sent by the UE and that is detected by another receiver UE to implement synchronization, including a synchronization signal between devices. When a synchronization source is a GNSS, the synchronization signal is a predefined synchronization signal transmitted by satellite systems of various standards, so that a satellite receiver module can receive the synchronization signal and implement functions such as time-frequency synchronization, time serving, and positioning.

Figure 2A:
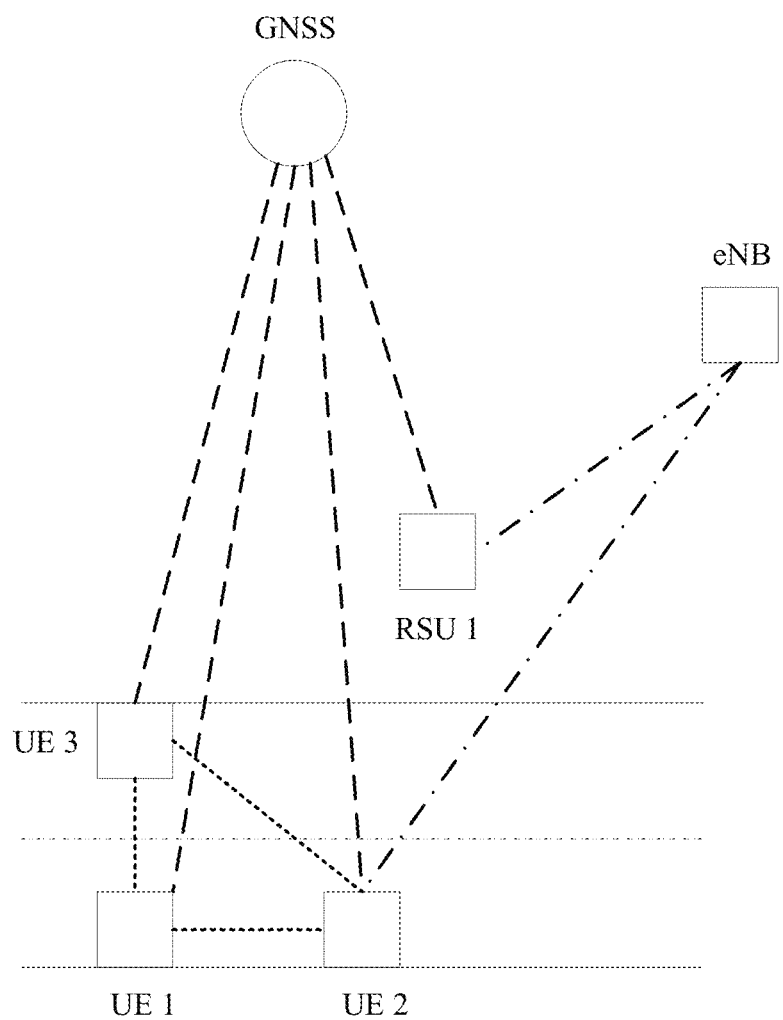
FIG. 2A is a schematic diagram of a system architecture according to an embodiment of the present invention.

FIG. 2A is a schematic diagram of a system architecture 200 according to an embodiment of the present invention. As shown in FIG. 2A, the system architecture 200 includes:

a plurality of user equipments (UE 1, UE 2, and UE 3), where the user equipments may communicate with each other;

one or more base stations (eNB), where the one or more base stations may communicate with each user equipment and/or RSU; and one or more global navigation satellite systems (GNSS), where the one or more global navigation satellite systems may provide, for example, information about positioning, time serving, and time-frequency synchronization for another network element.

The UE 1 and the UE 2 have maximum relative moving speeds when the UE 1 and the UE 2 move in opposite directions as a vehicle moves at a high speed. The user equipments may communicate with each other, and may use a cellular link spectrum, or may use an intelligent transportation spectrum near 5.9 GHz during communication. A technology used by the user equipments to communicate with each other may be enhanced based on an LTE protocol, or may be enhanced based on a D2D technology. This is not limited in this embodiment of the present invention.

FIG. 2B is a schematic diagram of a scenario of multiple types of synchronization sources according to an embodiment of the present invention.

In FIG. 2B, UE 4, UE 5, and UE 6 can detect a synchronization signal sent only by UE. For example, the UE 4 can detect synchronization sources that come from UE 1, UE 2, and UE 7. A synchronization reference source of the UE 1 is a GNSS. When sending out a synchronization signal and/or control information, the UE 1 needs to indicate, to a receiver of the UE 1, that a synchronization reference source type of the UE 1 is the GNSS. In addition, when sending out the synchronization signal and/or the control information, the UE 1 instructs that a hop count of the UE 1 is the first hop (it is assumed that a hop count from the GNSS to the UE 1 is the zeroth hop). The UE 7 is a synchronization source that performs sending by using the UE 7 as a timing reference. In this case, the timing reference of the UE 7 is generated based on a local device of the UE 7, such as a local crystal oscillator.

FIG. 3 is a schematic flowchart of a synchronization method 300 according to an embodiment of the present invention. As shown in FIG. 3, the synchronization method 300 includes the following content.

310. UE obtains synchronization information, where the synchronization information includes at least one of the following information: synchronization source selection parameter information, synchronization source indication information, or synchronization source priority information.

The synchronization source selection parameter information may include at least one of the following: a synchronization source type, a signal quality threshold of a synchronization source, a hop count threshold of a synchronization source, a synchronization source detection/search duration threshold, or a stability threshold of a synchronization source. Signal quality includes at least one of reference signal received power (RSRP), reference signal received quality (RSRQ), or a received signal strength indicator (RSSI).

320. The UE receives a first synchronization signal sent by at least one synchronization source.

Specifically, the UE receives a first synchronization signal sent by each of the at least one synchronization source.

It should be understood that the at least one synchronization source may include a synchronization source of a GNSS type, an eNB type, or a UE type, or the at least one synchronization source may include multiple types of synchronization sources.

For example, in an application scenario with network coverage, the UE may receive synchronization signals sent by an eNB and a GNSS; in an application scenario without network coverage, the UE may receive a synchronization signal sent by a GNSS; or in a scenario in which neither an eNB nor a GNSS is detected, the UE may receive a synchronization signal sent by UE.

330. The UE determines a synchronization reference source according to the synchronization information and the first synchronization signal.

The synchronization reference source may be one of the at least one synchronization source detected by the UE in step 320. However, this is not limited in this embodiment of the present invention. When the at least one synchronization source detected by the UE does not satisfy a requirement in the synchronization information, the synchronization reference source is the UE.

After step 330, the UE may be synchronized with the synchronization reference source according to a synchronization signal of the synchronization reference source.

After the synchronization, the UE may communicate with another device. For example, the UE may communicate with the synchronization reference source, a base station, or another UE.

In this embodiment of the present invention, the synchronization information is obtained, and the synchronization reference source is determined according to the synchronization information and the synchronization signal sent by the at least one synchronization source, so that synchronization can be implemented.

In addition, in this embodiment of the present invention, when the at least one synchronization source detected by the UE includes multiple types of synchronization sources, the UE can determine the synchronization reference source from the multiple types of synchronization sources according to the synchronization information.

In some embodiments, step 310 may include: receiving, by the UE, the synchronization information sent by a base station.

For example, the synchronization information may be carried in signaling (such as a broadcast message or a dedicated message) delivered by the base station.

That is, the synchronization information may be delivered by the base station. However, this is not limited in this embodiment of the present invention. Alternatively, the synchronization information may be preconfigured on the UE, or may be predefined by using a protocol.

In some embodiments, before the UE receives the synchronization information, the method 300 may further include:

sending, by the UE, information about the at least one synchronization source to the base station, so that the base station determines the synchronization information according to the information about the at least one synchronization source.

Figure 4:
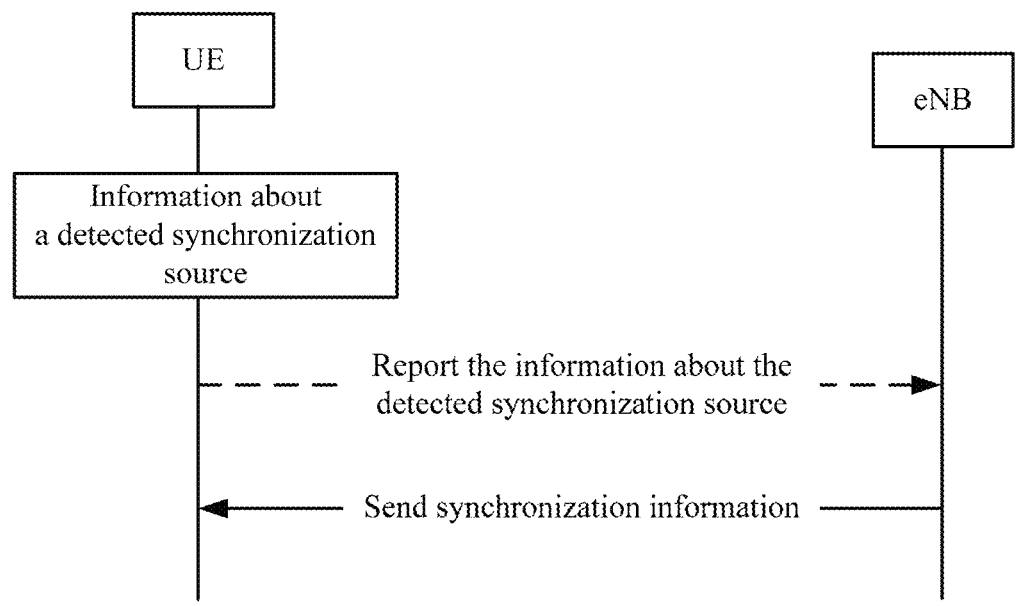
FIG. 4 is a schematic flowchart of a synchronization method according to another embodiment of the present invention.

As shown in FIG. 4, in this embodiment of the present invention, the UE may first report information about a synchronization source detected by the UE, and the base station sends synchronization information to the UE after receiving a report from the UE. The information about the synchronization source includes a type and corresponding signal quality.

The information about the synchronization source may include at least one of the following: a type, signal quality, or a hop count of the synchronization source. The signal quality of the synchronization source may include at least one of the following: RSRP, RSRQ, or an RSSI of the synchronization source, stability of a synchronization source signal, a stabilization time of a synchronization reference source, or a search time of the synchronization source.

For a method for determining the synchronization source type by the UE, refer to corresponding content described below. To avoid repetition, details are not described herein again.

In conclusion, the synchronization information may be preconfigured on the UE, or may be proactively delivered by the base station to the UE, or may be delivered to the UE by the base station after the base station receives information reported by the UE.

In another embodiment, the synchronization information may include the synchronization source selection parameter information. Accordingly, step 330 includes: selecting, by the UE from the at least one synchronization source, a synchronization source that satisfies the selection parameter information as the synchronization reference source according to the first synchronization signal.

For example, the selection parameter information may include the following: The synchronization reference source needs to satisfy (for example, be greater than or not less than) a corresponding signal quality threshold, or a detection/search time of the synchronization reference source is less than a corresponding threshold, or stability of the synchronization reference source satisfies a predefined condition, or the like.

In this embodiment of the present invention, the UE needs to detect signal quality of the at least one synchronization source, and then select the synchronization reference source according to the synchronization source selection parameter.

In another embodiment, the synchronization information may include the synchronization source indication information, and the synchronization source indication information indicates a first synchronization source. The synchronization source indication information includes at least one of the following: synchronization source identification information, synchronization source type information, or current hop count information of a synchronization source.

Accordingly, step 330 includes: selecting, by the UE, the first synchronization source as the synchronization reference source according to the first synchronization signal.

That is, the base station may specify the synchronization reference source for the UE.

If the synchronization information is sent by the base station, the synchronization reference source of the UE is actually selected by the base station. Because information on a base station side is the most secure, an optimal decision can be made according to this embodiment of the present invention.

In another embodiment, the synchronization information includes the synchronization source priority information. Accordingly, step 330 includes: selecting, by the UE from the at least one synchronization source, a synchronization source with a highest priority as the synchronization reference source according to the priority information and the first synchronization signal.

The synchronization source priority information may include at least one of the following: priority information of a synchronization source type, priority information of signal quality of a synchronization source, or priority information of a hop count of a synchronization source.

The priority information of the synchronization source type indicates a synchronization source with a highest priority or a priority ranking of various synchronization sources. For example, priorities of synchronization sources may be GNSS>eNB>UE, or may be eNB>GNSS>UE. When the UE is synchronized with the eNB and/or the GNSS, the synchronization source priority information may be indication information of rankings between UE synchronization sources with different hop counts, the GNSS, and the eNB. For example, GNSS>UE (a hop count of the GNSS is 1)>eNB>UE (a hop count of the eNB is 1), or eNB>UE (a hop count of the eNB is 1)>GNSS>UE (a hop count of the GNSS is 1). Examples are not listed herein.

The priority information of the signal quality of the synchronization source may indicate that a synchronization source with high signal quality is a preferred synchronization reference source. The priority information of the hop count of the synchronization source may indicate that a synchronization source with a minimum hop count is a preferred synchronization reference source.

That is, the synchronization source priority information may include one type of priority information, or may include multiple types of priority information. When there are a plurality of priorities, a defined order of the priorities may be used as a screening condition to select a synchronization reference source step by step. For example, there are three priorities: C1, C2, and C3. The three priorities may be the priority information of the synchronization source type, the priority information of the signal quality of the synchronization source, and the priority information of the hop count of the synchronization source. The UE may first use the priority C1 as a determining condition to select a synchronization reference source, further use the priority C2 as a determining condition to further select a synchronization reference source, and use the priority C3 as a determining condition to further select a synchronization reference source. If a determined synchronization source is selected in any one of the foregoing three steps, it may be considered that the synchronization reference source is successfully selected. If a synchronization reference source fails to be selected according to one of the conditions, the synchronization reference source continues to be selected according to other priority information until the determined synchronization reference source is selected.

That is, if the UE cannot select a synchronization source as a synchronization reference source according to one type of priority information, the UE may perform screening layer by layer in specific order according to multiple types of priority information, to determine a synchronization source as the synchronization reference source. For example, when multiple synchronization sources are selected according to a first type of priority information, the UE may further continue to select a synchronization source as a synchronization reference source according to a second type of priority information. Certainly, if a quantity of synchronization sources selected according to the second type of priority information is still greater than 1, the UE may perform further selection according to other priority information or perform random selection. Details are not described herein.

When there are multiple types of priority information, an order of the multiple types of priority information used when the UE selects the synchronization reference source is not limited in this embodiment of the present invention.

It should be noted that when a quantity of selected synchronization reference sources is greater than 1, the UE may randomly select a finally used synchronization reference source.

For example, when M1 synchronization sources are detected, the UE first selects M2 synchronization sources of an eNB type from the M1 synchronization sources according to the priority information of the synchronization source type, for example, eNB>GNSS>UE, and then selects, from the M2 synchronization sources, a synchronization source whose signal quality satisfies a predefined condition as a synchronization reference source. When signal quality of M3 synchronization sources in the M2 synchronization sources is the same, in an application scenario in which the M3 synchronization sources are M3 synchronization reference sources that require UE forwarding, the UE may further select, from the M3 synchronization sources, a synchronization source with a minimum UE forwarding hop count as a synchronization reference source.

For another example, a synchronization reference source of the UE 1 shown in FIG. 2B is a GNSS. If a synchronization reference source used when the UE 2 performs sending is also the GNSS, because the synchronization reference sources are the same, the UE 4 may perform selection according to hop counts and signal quality when receiving synchronization information sent by the UE 1 and the UE 2. The hop counts herein are just the same. Therefore, the UE 4 may perform selection according to the signal quality. For example, if a loss from the UE 1 to the UE 4 is smaller, the UE 4 may select the UE 1 as a synchronization source of the UE 4. Similarly, the UE 5 can receive synchronization information sent by the UE 2, the UE 4, and the UE 6, and the UE 5 needs to select, from the UE 2, the UE 4, and the UE 6, a synchronization source as a synchronization reference source. If the UE 5 performs selection according to a minimum hop count criterion, the UE 5 may select the UE 2 as a synchronization source of the UE 5 (if the UE 2 has selected the GNSS or an eNB as a synchronization source of the UE 2).

In another embodiment, the synchronization source indication information indicates a first synchronization source. Accordingly, step 330 may include:

determining, by the UE according to the first synchronization signal, that the at least one synchronization source includes the first synchronization source; and if the first synchronization source satisfies a predefined condition, selecting, by the UE, the first synchronization source as the synchronization reference source; or if a signal of the first synchronization source does not satisfy a predefined condition, selecting, by the UE from the at least one synchronization source except the first synchronization source, a second synchronization source with a highest priority as the synchronization reference source according to the priority information.

The predefined condition may include at least one of the following: Signal quality of the second synchronization source satisfies a preset threshold, a hop count of the second synchronization source satisfies a preset threshold, detection/search duration of the second synchronization source satisfies a preset threshold, or a type of the second synchronization source is a preset type.

The predefined condition may be preconfigured on the UE, or may be carried in the synchronization information, or may be obtained by the UE in another manner. This is not limited in this embodiment of the present invention. Similarly, the priority information may be preconfigured on the UE, or may be carried in the synchronization information, or may be obtained by the UE in another manner. This is not limited in this embodiment of the present invention.

That is, if the synchronization source indication information in the synchronization information indicates that a GNSS is to be used as the synchronization reference source, when the UE detects multiple synchronization sources of multiple different types, the UE first determines whether the GNSS is detected. If the detected GNSS signal satisfies a predefined condition, the UE directly uses the GNSS as the synchronization reference source to send out a synchronization signal, indicates, to a receiver of the UE, that the used synchronization reference source is the GNSS, and indicates a hop count of a synchronization signal sent by the UE. If the GNSS is not detected, or if the detected GNSS signal does not satisfy a predefined condition, the UE selects the synchronization reference source according to priority information and information such as a type, signal quality, or a hop count of another synchronization source detected by the UE or a synchronization source/a synchronization reference source that requires UE forwarding. For descriptions of selecting the synchronization reference source according to the priority information, refer to the foregoing descriptions. Details are not described herein again.

The following describes in detail the method in this embodiment of the present invention with reference to specific examples in Scenario 1 and Scenario 2.

Scenario 1: A GNSS is a preferred synchronization source. Scenario 1 is applicable to a scenario in which an eNB configures the GNSS as the preferred synchronization source outside a network and/or in a network.

Step 1: If obtained synchronization information indicates that the GNSS is the preferred synchronization source, when a receiver detects multiple synchronization sources of multiple different types, the receiver first determines whether the receiver detects the GNSS and whether the detected GNSS satisfies a predefined condition.

Step 2: If the detected GNSS signal satisfies the predefined condition, the receiver directly uses the GNSS as a synchronization reference source, sends out a synchronization signal, indicates, to the receiver, that the used synchronization reference source is the GNSS, and indicates a hop count of a synchronization signal sent by the receiver.

Step 3: If the GNSS is not detected, or if the detected GNSS signal does not satisfy the predefined condition, sequentially select a synchronization source according to the following criterion and information such as a type, signal quality, or a hop count of another synchronization source detected by the UE or a synchronization reference source that requires the UE to forward signals (in this case, synchronization sources may include a GNSS and UE, and a timing reference source that requires the UE to forward signals may include one of an eNB, a GNSS, or UE).

(1) A synchronization source type is a first priority, signal quality is a second priority, and a hop count is a third priority.

For example, the UE receives signals that are from multiple synchronization reference sources and that are forwarded by the UE, and the multiple synchronization reference sources are M1 synchronization reference sources of an eNB type, M2 synchronization reference sources of a GNSS type, and M3 synchronization reference sources of a UE type.

If a synchronization reference source type is the first priority, for example, an order of priorities is GNSS>eNB>UE, the UE finds M21 synchronization reference sources whose signal quality satisfies a predefined condition from the M2 synchronization reference sources of the GNSS type, then finds a synchronization reference source with a minimum hop count from the M21 synchronization reference sources, and uses the synchronization reference source as a synchronization reference source of the UE.

The second priority and the third priority may be interchanged. For example, the UE may find M21 synchronization reference sources whose hop counts satisfy a predefined condition from the M2 synchronization reference sources of the GNSS type, and then find a synchronization reference source with highest signal quality from the M21 synchronization reference sources.

(2) Signal quality is a first priority, a type is a second priority, and a hop count is a third priority.

For example, the UE receives signals that are from multiple synchronization reference sources and that are forwarded by the UE, and the multiple synchronization reference sources are M1 synchronization reference sources of an eNB type, M2 synchronization reference sources of a GNSS type, and M3 synchronization reference sources of a UE type.

If the signal quality is the first priority, the UE finds M4 synchronization reference sources whose signal quality satisfies a predefined condition from all the synchronization reference sources, then finds M41 synchronization reference sources of a type with a highest priority from the M4 synchronization reference sources, and finally finds M411 synchronization reference sources with a minimum hop count from the M41 synchronization reference sources.

Likewise, the second priority and the third priority may be interchanged.

(3) A smaller/minimum hop count is a first priority, a type is a second priority, and a hop count is a third priority.

For example, the UE receives signals that are from multiple synchronization reference sources and that are forwarded by the UE, and the multiple synchronization reference sources are M1 synchronization reference sources of an eNB type, M2 synchronization reference sources of a GNSS type, and M3 synchronization reference sources of a UE type.

If the smaller/minimum hop count is the first priority, the UE finds M4 synchronization reference sources with a minimum hop count from all the synchronization reference sources, then finds M41 synchronization reference sources of a type with a highest priority from the M4 synchronization reference sources, and finally finds M411 synchronization reference sources whose signal quality satisfies a predefined condition from the M41 synchronization reference sources.

Likewise, the second priority and the third priority may be interchanged.

Scenario 2: An eNB is a preferred synchronization source. Scenario 2 is applicable to a scenario with the eNB in a network and/or outside a network.

Step 1: Obtained synchronization information instructs to select a GNSS or an eNB as a synchronization reference source according to a predefined condition.

Step 2: UE selects a synchronization source according to the following criterion and information such as a type, signal quality, or a hop count of another synchronization source (an eNB and/or a GNSS) detected by the UE and a synchronization source/a synchronization reference source that requires UE forwarding (in this case, the synchronization source/the synchronization reference source may include one of an eNB, a GNSS, or UE):

(1) A synchronization source type is a first priority, and either signal quality or a hop count may be a second priority; or (2) Signal quality is a first priority, and either a synchronization source type or a hop count may be a second priority; or (3) A hop count is a first priority, and either signal quality or a synchronization source type may be a second priority.

For a specific process of determining the synchronization reference source according to the foregoing criterion, refer to related descriptions of Scenario 1. For brevity, details are not described herein again.

It should be noted that when a synchronization source detected by the UE includes an independent synchronization source such as a GNSS or an eNB, the UE may preferably select the GNSS or the eNB as a synchronization reference source. If the UE detects another synchronization reference source (an eNB and/or a GNSS) in addition to a synchronization signal and/or control information sent by another synchronization source UE, the UE preferably determines a synchronization reference source of the UE from the another synchronization reference source (the eNB and/or the GNSS).

It should be noted that the synchronization source priority information is not limited to the foregoing described content. For example, the synchronization source priority information may further include detection/search duration priority information of a synchronization source, stability priority information of the synchronization source, and the like.

In another embodiment, the first synchronization signal includes a second synchronization signal and/or a third synchronization signal.

Accordingly, step 330 includes:

determining, by the UE, a type of the at least one synchronization source according to a sequence of the second synchronization signal and/or a sequence of the third synchronization signal; and determining, by the UE, the synchronization reference source according to the synchronization information and the type of the at least one synchronization source.

It should be noted that, in this embodiment of the present invention, the first synchronization signal may include the second synchronization signal and/or the third synchronization signal. That is, there may be both the second synchronization signal and the third synchronization signal, or there may be only the second synchronization signal or the third synchronization signal. The second synchronization signal is generated from a ZC (Zadoff-Chu) sequence, and the third synchronization signal is generated from two m-sequences similar to those in a Long Term Evolution (LTE) system. Corresponding to the prior art, the second synchronization signal may be a primary D2D synchronization signal (PD2DSS) in a device-to-device (D2D) system, or may be a primary synchronization signal (PSS) in LTE, or may be a signal generated from a ZC sequence with another length. The third synchronization signal may be a secondary D2D synchronization signal (SD2DSS) in the D2D system, or may be a secondary synchronization signal (SSS) in LTE, or may be a sequence generated from an m-sequence with another length. A modulation scheme used for the second synchronization signal and the third synchronization signal may be orthogonal frequency division multiplexing (OFDM), or may be single carrier frequency division multiple access (SC-FDMA). This is not limited in this embodiment of the present invention. Different root sequence numbers may be used to represent different first synchronization sequences, for example, first synchronization sequences 26 and 37.

In the following embodiment of the present invention, a term of a synchronization signal in the D2D system is used. However, as described above, the method in this embodiment of the present invention is not limited to the D2D system. In this embodiment of the present invention, different combinations of the sequence of the second synchronization signal or the sequence of the third synchronization signal are used to indicate a synchronization source type, to facilitate use by a transmitter of a synchronization source and a receiver of the synchronization source.

In some embodiments, the UE may determine the type of the at least one synchronization source according to a sequence of the second synchronization signal in the first synchronization signal.

In a possible implementation, a first sequence, a second sequence, and a third sequence of the second synchronization signal are used to indicate different synchronization source types, and the first sequence, the second sequence, and the third sequence are different from each other.

For example, the first sequence indicates that a synchronization source type is a GNSS, the second sequence indicates that a synchronization source type is a base station, and the third sequence indicates that a synchronization source type is UE.

In an existing D2D synchronization sequence design process, a PD2DSS includes two sequences, and the two sequences are generated from ZC sequences, are corresponding to root sequence numbers 26 and 37, and are corresponding to a synchronization source eNB (in a scenario with a network) and a synchronization source UE (in a scenario without a network). Synchronization source ID numbers corresponding to the two sequences are as follows:

PD2DSS sequence 26: A corresponding identifier is id_net, and a sequence identifier set of the PD2DSS sequence is {0, 167}; and PD2DSS sequence 37: A corresponding identifier is id_oon, and a sequence identifier set of the PD2DSS sequence is {168, 335}.

For example, a first sequence is a sequence x, a second sequence is a sequence 26, and a third sequence is a sequence 37, where x is a value of a root sequence of a ZC sequence that has a length of 63 and that is corresponding to the PD2DSS, and ranges from 1 to 62. In addition, the sequence x is different from the sequences 26 and 37, and has relatively low cross-correlation with the sequences 26 and 37.

For example, the sequence x may be a sequence 29, 31, 23, 25, 34, 32, 40, 38, or the like, and is corresponding to a synchronization reference source type GNSS. Alternatively, a root sequence number used to generate the PD2DSS sequence x may be in another group, for example, {25, 29, 34}. This is not limited in the present invention. A synchronization source ID number corresponding to the sequence x is as follows:

PD2DSS sequence x: A corresponding identifier is id_gnss, and a sequence identifier set is {336, 504}.

The PD2DSS sequence x indicates that a synchronization source type is a GNSS. It means that if a synchronization reference source selected by a transmitter of a synchronization source is the GNSS, a PD2DSS signal transmitted by the transmitter of the synchronization source is the sequence x, and a sequence identifier set of a corresponding synchronization source is {336, 504}. If a receiver detects that a PD2DSS sequence sent by a synchronization source is any one of a sequence 26, 37, or x, it means that the receiver receives the PD2DSS sequence from a corresponding synchronization source.

The newly added PD2D sequence x indicates the synchronization reference source GNSS. This does not affect existing D2DSS signal sending or generation, and can be totally compatible with the prior art.

It should be noted that synchronization source types corresponding to the PD2DSS sequences 26, 37, and x are not limited in this embodiment of the present invention. For example, the PD2DSS sequence 26 may be used to indicate that a synchronization source type is UE, the PD2DSS sequence 37 may be used to indicate that a synchronization source type is a GNSS, and the PD2DSS sequence x may be used to indicate that a synchronization source type is an eNB.

In another possible implementation, the second synchronization signal includes a first symbol and a second symbol, and multiple combinations of a sequence used by the first symbol or a sequence used by the second symbol are used to indicate different synchronization source types.

Figure 5:
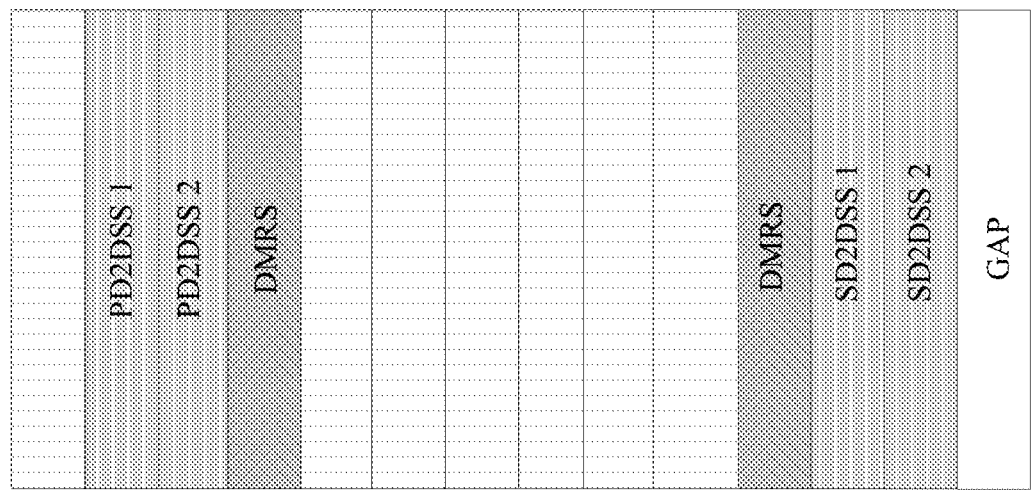
FIG. 5 is a schematic diagram of a synchronization signal according to an embodiment of the present invention.

FIG. 5 shows a schematic diagram of a synchronization signal and a PSBCH channel in D2D communication. As shown in FIG. 5, a D2D synchronization signal D2DSS includes a PD2DSS and an SD2DSS. A white part with a horizontal line is used to place a PSBCH symbol, other two demodulation reference signals (DMRS) are reference signals for PSBCH demodulation, and the last symbol is an empty symbol and is represented by GAP.

As shown in FIG. 5, the PD2DSS occupies a symbol 1 and a symbol 2 for transmission. Multiple combinations of a sequence used by the symbol 1 or a sequence used by the symbol 2 may be used to indicate different synchronization source types. Examples are as follows:

{PD2DSS symbol 1 sequence, PD2DSS symbol 2 sequence}={26, 26}→id_net: {0, 167}; and/or {PD2DSS symbol 1 sequence, PD2DSS symbol 2 sequence}={26, 37}→id_gnss: {168, 335}; and/or {PD2DSS symbol 1 sequence, PD2DSS symbol 2 sequence}={37, 26}→id_oon: {336, 504}; and/or {PD2DSS symbol 1 sequence, PD2DSS symbol 2 sequence}={37, 37}→id_gnss: {505, 772}.

In addition to indicating that a synchronization source is a GNSS, {26, 37}→id_gnss: {168, 335} may indicate that a synchronization reference source used when there is a network is the GNSS. In addition to indicating that a used synchronization reference source is a GNSS, {37, 37}→id_gnss: {505, 772} may indicate that a synchronization reference source used when there is no network is the GNSS.

In this embodiment of the present invention, a quantity of to-be-detected D2DSS sequences is not increased, but the two symbols occupied by the PD2DSS are used for mapping based on different combinations, so as to indicate different synchronization reference source types.

In some embodiments, the UE may further determine the type of the at least one synchronization source according to a sequence of the third synchronization signal.

In a possible implementation, a sequence set of the third synchronization signal includes at least two sequence subsets, and the at least two sequence subsets are used to indicate different synchronization source types.

In this embodiment of the present invention, the sequence of the second synchronization signal may be the same as that in the prior art. The sequence set of the third synchronization signal is divided into the at least two subsets to indicate the different synchronization source types. Examples are as follows:

PD2DSS sequence 26: A first sequence subset corresponding to an SD2DSS indicates that a synchronization source type is an eNB, and a second sequence subset corresponding to the SD2DSS indicates that a synchronization reference source type is a GNSS; and/or PD2DSS sequence 37: A first sequence subset corresponding to an SD2DSS indicates that a synchronization source type is a synchronization source UE, and a second sequence subset corresponding to the SD2DSS indicates that a synchronization source type is a GNSS.

Method 1 and Method 2 described below may be used to divide an SD2DSS sequence set into two subsets.

Method 1: An existing secondary synchronization sequence {0, 167} is divided into two subsets, and the two subsets may be sequences with consecutive SD2DSS numbers, for example, {0, x} is a first subset, and {x+1, 167} is a second subset, or may be sequences with non-consecutive SD2DSS numbers. This is not limited in this embodiment of the present invention. Configuration information of the two subsets may be indicated by a base station, or may be predefined. Examples are as follows:

PD2DSS sequence 26: A synchronization reference source is an eNB, a corresponding identifier is id_net, and an SD2DSS sequence set is {0, x}; and a synchronization reference source is a GNSS, a corresponding identifier is id_gnss, and an SD2DSS sequence set is {x+1, 167}; and/or PD2DSS sequence 37: A synchronization reference source is UE, a corresponding identifier is id_oon, and an SD2DSS sequence set is {168, y}; and a synchronization reference source is a GNSS, a corresponding identifier is id_gnss, and an SD2DSS sequence set is {y+1, 335}.

There is another mapping method for a synchronization source identifier set, provided that a GNSS is corresponding to a subset of the SD2DSS sequence set. Examples are not listed herein.

In this embodiment of the present invention, because a new PD2DSS sequence is not added, and a total quantity of SD2DSS sequences is not increased, either, detection performed by a receiver is not more complex.

Method 2: Existing SD2DSS sequences {0, 167} do not change, and a quantity of SD2DSS sequences is increased. For example, extended SD2DSS sequences are {0, 335}. It should be noted that an SD2DSS sequence is generated in a manner the same as that in an existing D2D protocol, and is generated from two m-sequences, each with a length of 31. Theoretically, the two m-sequences, each with a length of 31, may include at least 31×30/2=465 different secondary synchronization sequences in total. Therefore, a secondary synchronization sequence whose number is greater than 167 and that is not used in existing LTE and D2D systems may be used to indicate a new synchronization source type. Examples are as follows:

PD2DSS sequence 26: A synchronization reference source is an eNB, a corresponding identifier is id_net, and an SD2DSS sequence set is {0, 167}; and a synchronization reference source is a GNSS, a corresponding identifier is id_gnss, and an SD2DSS sequence set is {167, 335}; and/or PD2DSS sequence 37: A synchronization reference source is UE, a corresponding identifier is id_oon, and an SD2DSS sequence set is {336, 503}; and a synchronization reference source is a GNSS, a corresponding identifier is id_gnss, and an SD2DSS sequence set is {504, 771}.

Information about an extended SD2DSS sequence set may be configured by a base station, or may be predefined.

In this embodiment of the present invention, a new PD2DSS sequence is not added, but available SD2DSS sequences are extended to indicate different synchronization source types, so that a quantity of identifiable synchronization sources is provided.

In another possible implementation, the third synchronization signal includes a third symbol and a fourth symbol, and multiple combinations of a sequence used by the third symbol or a sequence used by the fourth symbol are used to indicate different synchronization source types.

As shown in FIG. 4, the SD2DSS occupies a symbol 1 and a symbol 2 for transmission. Multiple combinations of a sequence used by the symbol 1 or a sequence used by the symbol 2 may be used to indicate different synchronization source types. Examples are as follows:

PD2DSS=26, {SD2DSS symbol 1 sequence, SD2DSS symbol 2 sequence}={x, x}→id_net: {0, 167}; and/or PD2DSS=26, {SD2DSS symbol 1 sequence, SD2DSS symbol 2 sequence}={x, y}→id_gnss: {168, 335}; and/or PD2DSS=37, {SD2DSS symbol 1 sequence, SD2DSS symbol 2 sequence}={y, y}→id_oon: {336, 504}; and/or PD2DSS=37, {SD2DSS symbol 1 sequence, SD2DSS symbol 2 sequence}={x, y}→id_gnss: {505, 772}.

Sequences x and y each are any sequence in an SD2DSS sequence set {0, 167}, or may be any sequence in a set {0, 335}, and SD2DSS sequence numbers corresponding to the sequences x and y are different.

In this embodiment of the present invention, a quantity of to-be-detected synchronization signal sequences is not increased, but the two symbols occupied by the third synchronization signal are used for mapping based on different combinations, so as to indicate different synchronization reference source types.

Alternatively, the UE may determine a synchronization source type according to a combination of a sequence of the second synchronization signal or a sequence of the third synchronization signal.

For example, multiple combinations of a sequence used by a first symbol, a sequence used by a second symbol, a sequence used by a third symbol, or a sequence used by a fourth symbol are used to indicate different synchronization source types; or different combinations of a sequence of the second synchronization signal or a sequence of the third synchronization signal are used to indicate different synchronization source types; or different combinations of a sequence of the second synchronization signal or sequences separately used by two symbols occupied by the third synchronization signal are used to indicate different synchronization source types; or different combinations of sequences separately used by two symbols occupied by the second synchronization signal or a sequence used by the third synchronization signal are used to indicate different synchronization source types.

That is, alternatively, with reference to a characteristic that the second synchronization signal and the third synchronization signal each occupy two symbols, mapping may be separately performed based on different combinations, so as to indicate different synchronization reference source types. For brevity, details are not described in this embodiment of the present invention.

In another embodiment, the method 300 further includes: receiving, by the UE, first control information sent by the at least one synchronization source.

For example, the UE receives first control information sent by each of the at least one synchronization source.

The control information may include at least one of the following information: auxiliary indication information of a synchronization source type, indication information indicating whether a synchronization signal is valid, indication information indicating whether a synchronization signal is sent, indication information of a synchronization signal sending cycle, indication information of a time-frequency location at which a synchronization signal is sent, or indication information of a hop count of a synchronization source.

When the control information is transmitted from the UE, the control information may be carried in multiple manners. For example, the control information may be explicitly or implicitly indicated by using a display field in a control channel such as a physical sidelink broadcast channel (PSBCH), or may be piggyback indicated by using a demodulation reference signal (DMRS) on a PSBCH channel, or may be implicitly indicated by using a cyclic redundancy check (CRC) mask of a PSBCH packet. For another example, the control information may be indicated by using a control channel for service data sent by the UE, such as a physical sidelink control channel (PSCCH), or may be indicated by using a service channel transmitted by the UE, such as a physical sidelink shared channel (PSSCH). This is not limited in the present invention.

The indication information of the hop count of the synchronization source indicates a current hop count between a synchronization source of a UE type and a synchronization reference source that requires UE forwarding.

For example, when the UE can detect a valid GNSS, and/or receive signaling that is sent by an eNB and that is used to instruct the UE to use the GNSS as a synchronization reference source or a preferred synchronization reference source, the UE uses the GNSS as the synchronization reference source, and is synchronized with the GNSS.

If the UE has been directly synchronized with the GNSS, the UE directly receives control information without receiving a D2DSS signal. If the receiver has been synchronized with a synchronization source that uses the GNSS as a synchronization reference source, the receiver needs to detect only a small quantity of D2DSSs, and then directly receive the control information.

When the UE detects the GNSS, the UE, as a synchronization source, may send the control information while sending a synchronization signal in a sparser manner or not sending a synchronization signal. The sending a synchronization signal in a sparser manner includes: sending the synchronization signal only in some start subframes in synchronization signal subframes, not in a subsequent subframe; or sending the synchronization signal in a period greater than a PSBCH period (for example, 40 ms), such as 80 ms, 120 ms, or 160 ms; or directly sending only the control information without sending the synchronization signal.

In this embodiment of the present invention, when the UE detects the GNSS, the UE uses the GNSS as the synchronization reference source. In this case, the UE may send no synchronization signal or send a small quantity of synchronization signals. This can reduce a quantity of unnecessary signal transmissions and a quantity of unnecessary synchronization signal detections performed by another UE, so that power consumption is reduced, and complexity of the UE is reduced.

In some embodiments, step 330 may include:

determining, by the UE, a type of the at least one synchronization source according to the first control information; and determining, by the UE, the synchronization reference source according to the synchronization information, the first synchronization signal, and the type of the at least one synchronization source.

In some embodiments, the UE may determine a type of the at least one synchronization source according to a sequence of the second synchronization signal and/or a sequence of the third synchronization signal, and the first control information.

For example, the control information may be 1-bit indication information, and is represented by Flag.

PD2DSS=26, Flag=0, {id_net_eNB}: {0, 167} indicates that a synchronization reference source is preferably an eNB;

PD2DSS=26, Flag=1, {id_net_GNSS}: {168, 335} indicates that a synchronization reference source is preferably a GNSS if an eNB exists;

PD2DSS=37, Flag=0, {id_oon_nGNSS}: {336, 504} indicates that a synchronization reference source is preferably a GNSS if an eNB does not exist; and PD2DSS=37, Flag=1, {id_oon_wGNSS}: {505, 772} indicates that a synchronization reference source is preferably UE if an eNB does not exist.

Specifically, the control information may be carried in a display field in a PSBCH channel, or may be implicitly indicated by using another field in a PSBCH channel or a DMRS or a CRC on a PSBCH channel. This is not limited in this embodiment of the present invention.

In this embodiment of the present invention, there is no need to change a method for sending a D2DSS sequence and a signal, and the D2DSS sequence and the signal are used together with the control information to indicate a synchronization source type.

It should be noted that after the UE sends a synchronization signal and/or control information according to the synchronization reference source determined in step 330, if a new synchronization source is detected, and a priority of the new synchronization source is higher than a priority of the synchronization reference source, the UE uses the new synchronization source as a new synchronization reference source to send a new synchronization signal and/or new control information. For example, the UE 7 in FIG. 2B is relatively isolated UE. If the UE 7 can receive synchronization information sent by the UE 4, or can detect a GNSS later, the UE 7 may be synchronized with the UE 4 or the GNSS.

In another embodiment, the method 300 may further include: sending, by the UE, a second synchronization signal and/or second control information according to the synchronization reference source, where the second synchronization signal and/or the second control information are/indicates a type of the synchronization reference source.

In this case, the UE may be used as a synchronization source to send out a synchronization signal and/or control information.

It should be understood that, for a specific manner in which the second synchronization signal and/or the second control information indicate/indicates the type of the synchronization reference source, refer to the foregoing method in which the first synchronization signal and/or the first control information indicate/indicates the synchronization reference source. To avoid repetition, details are not described herein again.

It should be noted that not all UEs need to become synchronization sources, and UE spontaneously becomes a synchronization source only when a specific condition is satisfied. For example, the UE detects that a synchronization source satisfies at least one of the following:

Signal quality of another synchronization source detected by the UE does not satisfy a predefined threshold; or signal quality of another synchronization source detected by the UE satisfies a predefined threshold, but a hop count from the another synchronization source is greater than a predefined threshold.

In this case, the UE becomes a synchronization source, and sends a synchronization signal and/or control information.

The synchronization information may further include at least one of the following information: configuration information of a synchronization sequence used by a synchronization signal, transmit frequency-domain location information of a synchronization signal and/or control information, transmit time-domain location information of a synchronization signal and/or control information, or transmit power information of a synchronization signal and/or control information.

Specifically, the UE sends the synchronization signal and/or the control information according to the synchronization information.

In another embodiment, the method 300 may further include:

determining, by the UE, a timing offset between a timing reference of the synchronization reference source and a timing reference of a synchronization reference source in another link; and performing, by the UE, communication according to the timing reference of the synchronization reference source and the timing offset.

Figure 6:
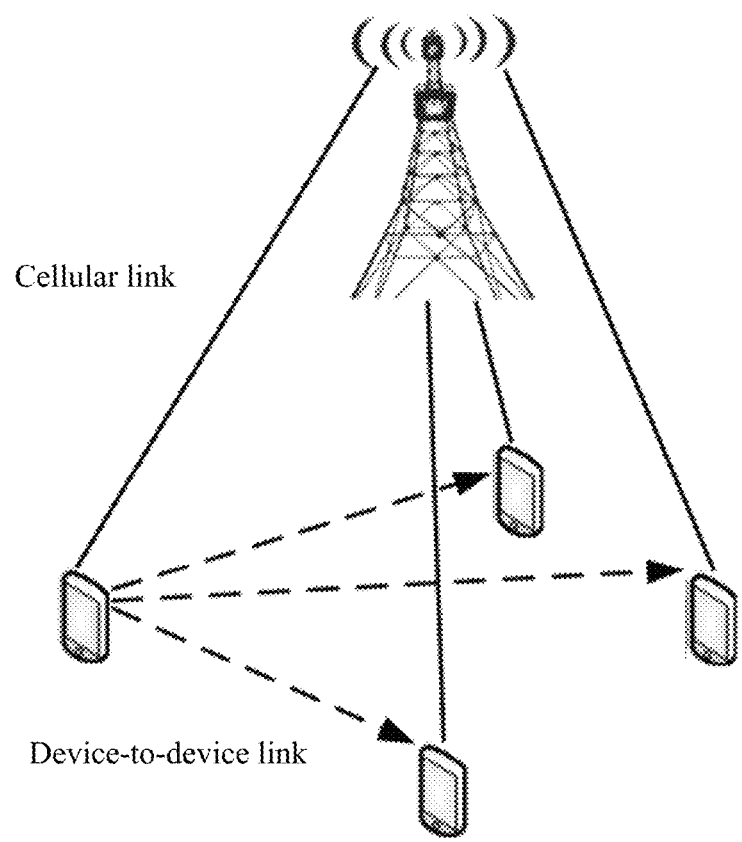
FIG. 6 is a schematic diagram of another system architecture according to an embodiment of the present invention.

As shown in FIG. 6, when both a device-to-device link and a cellular link exist, because of existence of a GNSS, device-to-device timing and synchronization references may use the GNSS as a uniform synchronization source, and use UTC time as a uniform time reference. A timing reference between eNBs, especially between asynchronous eNBs, is certainly different from the device-to-device timing reference.

Figure 7:
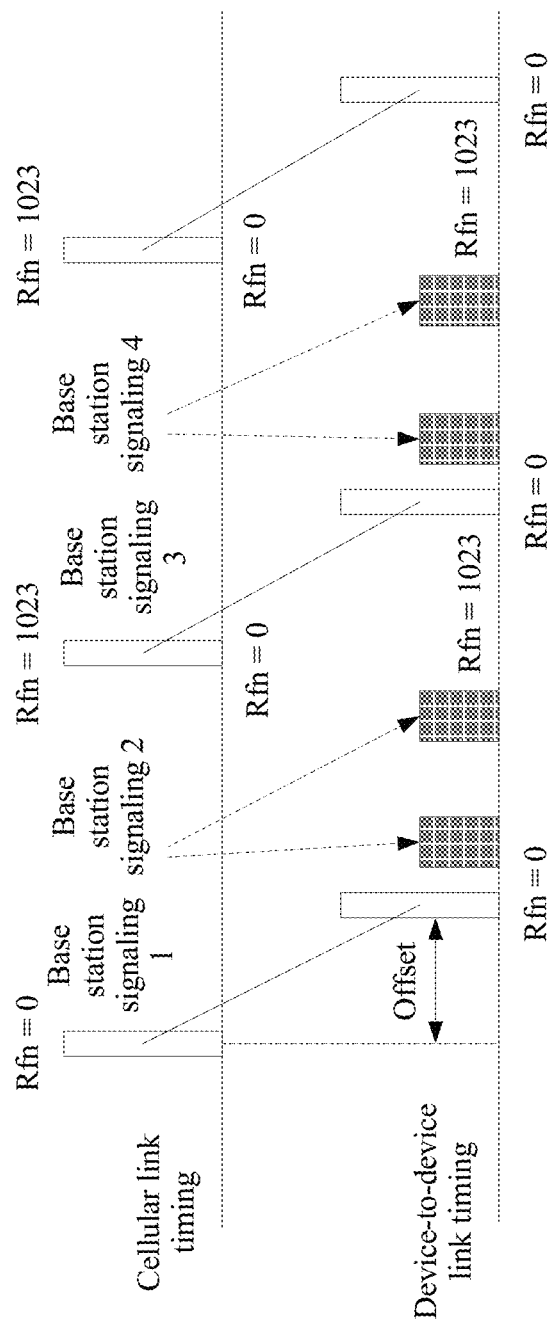
FIG. 7 is a schematic diagram of a timing offset between a cellular link and a device-to-device link according to an embodiment of the present invention.

A direct problem is as follows: As shown in FIG. 7, a start time location of a system frame number of a cellular link is different from a start time location of a system frame number of a device-to-device link. Such a difference causes understanding inconsistency in mapping between scheduling signaling of a base station and the device-to-device link. As shown in FIG. 7, because cellular link timing and device-to-device link timing are totally asynchronous, a correspondence between device-to-device transmission parameters that is configured by the base station may not be unique.

Therefore, in this embodiment of the present invention, the UE determines the timing offset between the timing reference of the synchronization reference source and the timing reference of the synchronization reference source in the another link, and performs communication according to the timing reference of the synchronization reference source and the timing offset, so as to resolve a problem that timing references of a D2D link and a cellular link are different when the two links exist.

In some embodiments, the UE may determine, according to an indication of the base station, a timing offset between a timing reference of the synchronization reference source and a timing reference of a synchronization reference source in another link.

Specifically, the determining, by the UE, a timing offset between a timing reference of the synchronization reference source and a timing reference of a synchronization reference source in another link includes:

receiving, by the UE, timing offset indication information sent by the base station, where the timing offset indication information indicates the timing offset; and determining, by the UE, the timing offset according to the timing offset indication information.

The timing offset indication information may include an offset between the timing reference of the synchronization reference source and the timing reference of the synchronization reference source in the another link.

For example, when the base station indicates, to UE served by the base station, a timing offset between a cellular link and a device-to-device link in a local cell and a neighboring cell by using signaling, indication information includes:

{cell identifier ID, timing offset between a cellular link and a device-to-device link}; or {cell identifier ID, offset between a cellular link and a predefined timing reference}.

The predefined timing reference may be UTC timing, or may be a predefined UTC timing-based start location of a system frame number of a device-to-device link or start location of a maximum frame that can be indicated. Both lengths of the system frame and the maximum frame that can be indicated are predefined. For example, in LTE, a length of the system frame number is 10 ms, and a length of the maximum frame that can be indicated is 1024 radio frames, that is, 10.24 s.

First, on the device-to-device link, it is necessary to predefine start time of a radio frame number of the device-to-device link at UTC time, for example, start time of a radio frame 0 of the device-to-device link is:

$$T_{start}=\text{Mod}(t_{UTC}+t_1,N), \text{ where}$$

$T_{start}$ is the start time of the radio frame 0 of the device-to-device link, $t_{UTC}$ is current UTC time, and $t_1$ is an offset. In the foregoing parameters, N is a predefined constant. When N is 1024, all time units are 10 ms; or when N is 10240, all time units are 1 ms. Mod is a modulo operator.

Signaling and/or configuration information sent by a base station to a device is configured based on start time $T_{eNB}$ of a system frame number of the base station. With a predefined calculation rule of $T_{start}$, the base station may configure, for the UE, a timing offset between two links according to timing of the base station. After the offset is configured for the UE, the UE may map, to transmission and receiving parameters of the UE, transmission information that is of the device-to-device link and that is configured by the base station. For example, if the offset is 100 ms, the configuration information of the D2D link that is received and that is indicated by the eNB is as follows: If device-to-device data is sent in a subframe 3, accordingly, the UE sends device-to-device data at a time of a link of the UE, that is, in a subframe 103 of the device-to-device link.

In some embodiments, the UE may determine, according to a predefined rule, a timing offset between a timing reference of the synchronization reference source and a timing reference of a synchronization reference source in another link.

Specifically, the determining, by the UE, a timing offset between a timing reference of the synchronization reference source and a timing reference of a synchronization reference source in another link includes:

obtaining, by the UE, the timing reference of the synchronization reference source in the another link; and determining, by the UE, the timing offset according to the timing reference of the synchronization reference source and the timing reference of the synchronization reference source in the another link.

For example, the UE obtains a timing list of a neighboring cell in a process of being synchronized with the base station, and then, if the UE is synchronized with a GNSS, the UE calculates, according to a predefined GNSS-based timing reference and detected timing of the neighboring cell, a timing offset used by the UE in each cell.

In this embodiment of the present invention, it is necessary to predefine the start time $T_{start}$ of the radio frame 0 of the device-to-device link. In addition, it is necessary to define a rule for determining an offset between $T_{start}$ and $T_{eNB}$. For example, the offset is determined according to the following rule:

$$\text{offset}=\text{Mod}(T_{start}-T_{eNB},N).$$

N is a predefined constant. When N is 1024, all time units are 10 ms; or when N is 10240, all time units are 1 ms. Mod is a modulo operator.

In conclusion, the UE may determine the timing offset between the two links in the two manners described above, so as to obtain signaling of transmission and receiving parameters of the UE.

FIG. 8 is a schematic flowchart of a synchronization method 800 according to an embodiment of the present invention. The method 800 is corresponding to the method 300, and corresponding content is appropriately omitted herein. As shown in FIG. 8, the method 800 includes the following content.

810. A base station determines synchronization information, where the synchronization information includes at least one of the following information: synchronization source selection parameter information, synchronization source indication information, or synchronization source priority information.

820. The base station sends the synchronization information to UE.

The UE may determine a synchronization reference source according to the synchronization information after receiving the synchronization information.

In this embodiment of the present invention, the synchronization information is sent to the user equipment, so that the user equipment can determine the synchronization reference source according to the synchronization information. In this way, synchronization can be implemented, and optimum communication performance is ensured.

In another embodiment, the synchronization method 800 further includes:

sending, by the base station, control information to the user equipment, where the control information is used to determine a type and/or an identifier of the synchronization reference source.

In another embodiment, the synchronization method 800 further includes: sending, by the base station, control information to the user equipment, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

The indication information of the hop count of the synchronization source indicates a maximum hop count of the synchronization source. The UE may forward the synchronization signal within the maximum hop count.

In some embodiments, step 810 specifically includes: receiving, by the base station, information about at least one synchronization source, where the information is sent by the user equipment; and determining, by the base station, the synchronization information according to the information about the at least one synchronization source.

In another embodiment, the synchronization method 800 further includes:

sending, by the base station, timing offset indication information to the user equipment, where the timing offset indication information indicates a timing offset between a timing reference of the synchronization reference source of the user equipment and a timing reference of a synchronization reference source in another link.

In this embodiment of the present invention, the synchronization information is sent to the user equipment, so that the user equipment can determine the synchronization reference source according to the synchronization information. In this way, synchronization can be implemented, and optimum communication performance is ensured.

FIG. 9 shows a schematic flowchart of a synchronization method 900 according to another embodiment of the present invention. The method 900 is corresponding to the method 300, and corresponding content is appropriately omitted herein. As shown in FIG. 9, the method 900 includes the following content.

910. UE determines a synchronization reference source, where a type of the synchronization reference source is any one of a GNSS, a base station, or UE.

It should be understood that the synchronization reference source may be the GNSS, the base station, or another UE, or may be the UE.

920. The UE sends a synchronization signal according to the synchronization reference source, where the synchronization signal includes a first synchronization signal and/or a second synchronization signal, and a sequence of the first synchronization signal and/or a sequence of the second synchronization signal are/indicates the type of the synchronization reference source.

In this case, the UE may be used as a synchronization source.

In this embodiment of the present invention, when the type of the synchronization reference source of the UE is any one of the GNSS, the base station, or the UE, the synchronization signal sent by the user equipment can indicate the type of the synchronization reference source, so that another user equipment can determine the synchronization reference source according to the synchronization signal. In this way, synchronization can be implemented, and optimum communication performance is ensured.

Specifically, that a sequence of the first synchronization signal and/or a sequence of the second synchronization signal are/indicates the type of the synchronization reference source includes:

at least one sequence of the first synchronization signal indicates the type of the synchronization reference source; or the first synchronization signal occupies a first symbol and a second symbol, and at least one combination of a sequence used by the first symbol or a sequence used by the second symbol indicates the type of the synchronization reference source; or a sequence set of the second synchronization signal includes at least two sequence subsets, and at least one of the at least two sequence subsets indicates the type of the synchronization reference source; or the second synchronization signal includes a third symbol and a fourth symbol, and at least one combination of a sequence used by the third symbol or a sequence used by the fourth symbol indicates the type of the synchronization reference source; or the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

In another embodiment, the method 900 further includes:

sending, by the user equipment, control information, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

The indication information of the hop count of the synchronization source indicates a current hop count from the user equipment to the synchronization reference source.

In some embodiments, the sequence of the first synchronization signal and/or the sequence of the second synchronization signal, and the control information are used to indicate the type of the synchronization reference source.

It should be understood that, in this embodiment of the present invention, for a method for determining the synchronization reference source by the UE in step 910, refer to the method for determining the synchronization reference source by the UE in the method 300. To avoid repetition, details are not described herein again.

In this embodiment of the present invention, when the type of the synchronization reference source of the UE is any one of the GNSS, the base station, or the UE, the synchronization signal sent by the user equipment can indicate the type of the synchronization reference source, so that another user equipment can determine the synchronization reference source according to the synchronization signal. In this way, synchronization can be implemented, and optimum communication performance is ensured.

The following describes in detail user equipment and a base station according to embodiments of the present invention with reference to FIG. 10 to FIG. 15.

Figure 10:
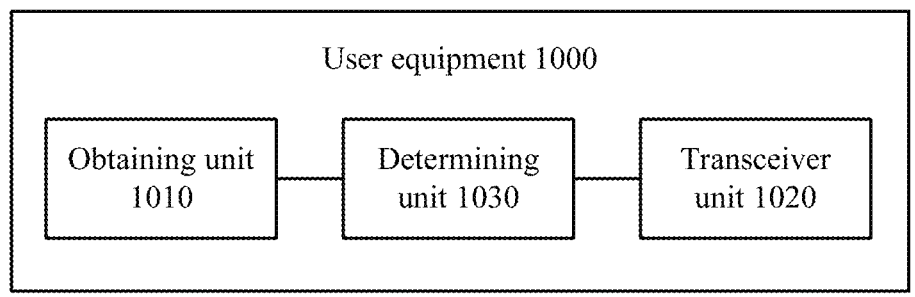
FIG. 10 is a schematic block diagram of user equipment according to an embodiment of the present invention.

FIG. 10 is a schematic block diagram of user equipment 1000 according to an embodiment of the present invention. As shown in FIG. 10, the user equipment 1000 includes an obtaining unit 1010, a transceiver unit 1020, and a determining unit 1030.

The obtaining unit 1010 is configured to obtain synchronization information, where the synchronization information includes at least one of the following information: synchronization source selection parameter information, synchronization source indication information, or synchronization source priority information.

The transceiver unit 1020 is configured to receive a first synchronization signal sent by at least one synchronization source.

The determining unit 1030 is configured to determine a synchronization reference source according to the synchronization information obtained by the obtaining unit 1010 and the first synchronization signal received by the transceiver unit 1020.

In this embodiment of the present invention, the synchronization information is obtained, and the synchronization reference source is determined according to the synchronization information and the synchronization signal sent by the at least one synchronization source, so that synchronization can be implemented.

In some embodiments, the determining unit 1030 is specifically configured to select, from the at least one synchronization source, a synchronization source that satisfies the selection parameter as the synchronization reference source according to the first synchronization signal.

In some embodiments, the synchronization source indication information indicates a first synchronization source, and the determining unit 1030 is specifically configured to select the first synchronization source as the synchronization reference source according to the first synchronization signal.

In some embodiments, the determining unit 1030 is specifically configured to select, from the at least one synchronization source, a synchronization source with a highest priority as the synchronization reference source according to the priority information and the first synchronization signal.

In some embodiments, the synchronization source indication information indicates a first synchronization source, and the determining unit 1030 is specifically configured to:

determine, according to the first synchronization signal, that the at least one synchronization source includes the first synchronization source; and if the first synchronization source satisfies a predefined condition, select the first synchronization source as the synchronization reference source; or if a signal of the first synchronization source does not satisfy a predefined condition, select, from the at least one synchronization source except the first synchronization source, a second synchronization source with a highest priority as the synchronization reference source according to the priority information.

In some embodiments, the first synchronization signal includes a second synchronization signal and/or a third synchronization signal, and the determining unit 1030 is specifically configured to:

determine a type of the at least one synchronization source according to a sequence of the second synchronization signal and/or a sequence of the third synchronization signal; and determine the synchronization reference source according to the synchronization information and the type of the at least one synchronization source.

A first sequence, a second sequence, and a third sequence of the second synchronization signal are used to indicate different synchronization source types, and the first sequence, the second sequence, and the third sequence are different from each other; or the second synchronization signal occupies a first symbol and a second symbol, and multiple combinations of a sequence used by the first symbol or a sequence used by the second symbol are used to indicate different synchronization source types; or a sequence set of the third synchronization signal includes multiple sequence subsets, and the multiple sequence subsets are used to indicate different synchronization source types; or the third synchronization signal occupies a third symbol and a fourth symbol, and multiple combinations of a sequence used by the third symbol or a sequence used by the fourth symbol are used to indicate different synchronization source types; or the second synchronization signal occupies a first symbol and a second symbol, the third synchronization signal occupies a third symbol and a fourth symbol, and multiple combinations of a sequence used by the first symbol, a sequence used by the second symbol, a sequence used by the third symbol, or a sequence used by the fourth symbol are used to indicate different synchronization source types.

In some embodiments, the transceiver unit 1020 is further configured to receive first control information sent by the at least one synchronization source.

Accordingly, the determining unit 1030 is specifically configured to:

determine a type of the at least one synchronization source according to the first control information; and determine the synchronization reference source according to the synchronization information, the first synchronization signal, and the type of the at least one synchronization source.

In some embodiments, the transceiver unit 1020 is further configured to receive first control information sent by the at least one synchronization source, where the first control information includes at least one of the following information: auxiliary indication information of a synchronization source type, indication information of a synchronization signal sending cycle, indication information indicating whether a synchronization signal is sent, indication information indicating whether a synchronization signal is valid, indication information of a time-frequency location at which a synchronization signal is sent, or indication information of a hop count of a synchronization source.

In some embodiments, the first synchronization signal includes a second synchronization signal and/or a third synchronization signal, and the determining unit 1030 is specifically configured to determine the type of the at least one synchronization source according to a sequence of the second synchronization signal and/or a sequence of the third synchronization signal, and the first control information.

In some embodiments, the obtaining unit 1010 is specifically configured to receive the synchronization information sent by a base station.

In some embodiments, the transceiver unit 1020 is further configured to: before the obtaining unit 1010 receives the synchronization information, send information about the at least one synchronization source to the base station, so that the base station determines the synchronization information according to the information about the at least one synchronization source.

In some embodiments, the transceiver unit 1020 is further configured to send a fourth synchronization signal and/or second control information according to the synchronization reference source, where the fourth synchronization signal and/or the second control information are/indicates a type of the synchronization reference source.

In some embodiments, the determining unit 1030 is further configured to determine a timing offset between a timing reference of the synchronization reference source and a timing reference of a synchronization reference source in another link; and the transceiver unit 1020 is further configured to perform communication according to the timing reference of the synchronization reference source and the timing offset determined by the determining unit 1030.

In some embodiments, the transceiver unit 1020 is further configured to receive timing offset indication information sent by the base station, where the timing offset indication indicates the timing offset; and the determining unit 1030 is specifically configured to determine the timing offset according to the timing offset indication information received by the transceiver unit.

In some embodiments, the obtaining unit 1010 is further configured to obtain the timing reference of the synchronization reference source in the another link; and the determining unit 1030 is specifically configured to determine the timing offset according to the timing reference of the synchronization reference source and the timing reference of the synchronization reference source in the another link.

It should be understood that the user equipment 1000 according to this embodiment of the present invention may be corresponding to the user equipment in the synchronization method 300 according to the embodiment of the present invention. In addition, the foregoing and other operations and/or functions of the units/modules in the user equipment 1000 are intended to implement corresponding procedures of the method 300 in FIG. 3. For brevity, details are not described herein again.

In this embodiment of the present invention, the synchronization information is obtained, and the synchronization reference source is determined according to the synchronization information and the synchronization signal sent by the at least one synchronization source, so that synchronization can be implemented.

Figure 11:
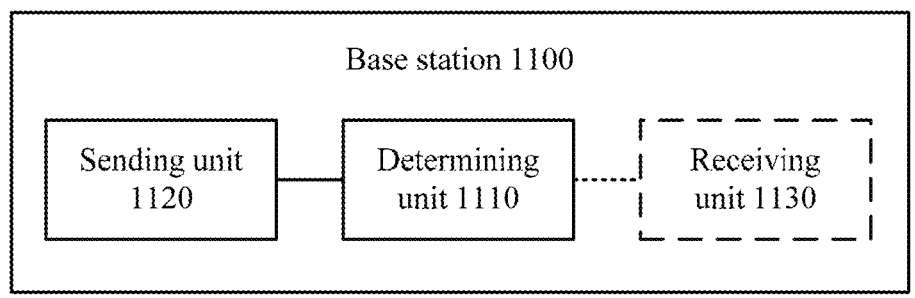
FIG. 11 is a schematic block diagram of a base station according to an embodiment of the present invention.

FIG. 11 is a schematic block diagram of a base station 1100 according to another embodiment of the present invention. As shown in FIG. 11, the base station 1100 includes a determining unit 1110 and a sending unit 1120.

The determining unit 1110 is configured to send synchronization information to user equipment, where the synchronization information includes at least one of the following information: synchronization source selection parameter information, synchronization source indication information, or synchronization source priority information, so that the user equipment determines a synchronization reference source according to the synchronization information.

The sending unit 1120 is configured to send the synchronization information to the user equipment.

In this embodiment of the present invention, the synchronization information is sent to the user equipment, so that the user equipment can determine the synchronization reference source according to the synchronization information. In this way, synchronization can be implemented, and optimum communication performance is ensured.

In some embodiments, the sending unit 1120 is further configured to send control information to the user equipment, where the control information indicates a type and/or an identifier of the synchronization reference source.

In some embodiments, the sending unit 1120 is further configured to send control information to the user equipment, where the control information may include at least one of the following information: auxiliary indication information of a synchronization source type, indication information of a synchronization signal sending cycle, indication information indicating whether a synchronization signal is valid, an indication indicating whether a synchronization signal is sent, indication information of a time-frequency location at which a synchronization signal is sent, or indication information of a hop count of a synchronization source.

In some embodiments, the base station 1100 may further include a receiving unit 1130.

The receiving unit 1130 is configured to: before the sending unit 1120 sends the synchronization information to the user equipment, receive information about at least one synchronization source, where the information is sent by the user equipment.

The determining unit 1110 is specifically configured to determine the synchronization information according to the information about the at least one synchronization source received by the receiving unit 1130.

In some embodiments, the sending unit 1120 is further configured to send timing offset indication information to the user equipment, where the timing offset indication information indicates a timing offset between a timing reference of the synchronization reference source of the user equipment and a timing reference of a synchronization reference source in another link.

It should be understood that the base station 1100 according to this embodiment of the present invention may be corresponding to the base station in the synchronization method 800 according to the embodiment of the present invention. In addition, the foregoing and other operations and/or functions of the units/modules in the base station 1100 are intended to implement corresponding procedures of the method 800 in FIG. 8. For brevity, details are not described herein again.

In this embodiment of the present invention, the synchronization information is sent to the user equipment, so that the user equipment can determine the synchronization reference source according to the synchronization information. In this way, synchronization can be implemented, and optimum communication performance is ensured.

Figure 12:
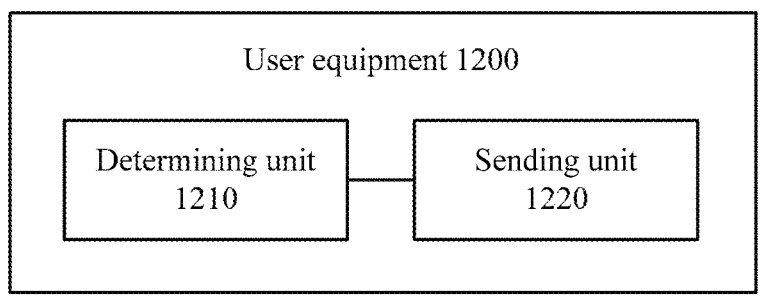
FIG. 12 is a schematic block diagram of user equipment according to another embodiment of the present invention.

FIG. 12 is a schematic block diagram of user equipment 1200 according to another embodiment of the present invention. As shown in FIG. 12, the user equipment 1200 includes a determining unit 1210 and a sending unit 1220.

The determining unit 1210 is configured to determine a synchronization reference source, where a type of the synchronization reference source is any one of a GNSS, a base station, or user equipment.

The sending unit 1220 is configured to send a synchronization signal according to the synchronization reference source, where the synchronization signal includes a first synchronization signal and/or a second synchronization signal, and a sequence of the first synchronization signal and/or a sequence of the second synchronization signal are/indicates the type of the synchronization reference source.

In this embodiment of the present invention, when the type of the synchronization reference source of the UE is any one of the GNSS, the base station, or the UE, the synchronization signal sent by the user equipment can indicate the type of the synchronization reference source, so that another user equipment can determine the synchronization reference source according to the synchronization signal. In this way, synchronization can be implemented, and optimum communication performance is ensured.

At least one sequence of the first synchronization signal indicates the type of the synchronization reference source; or the first synchronization signal occupies a first symbol and a second symbol, and at least one combination of a sequence used by the first symbol or a sequence used by the second symbol indicates the type of the synchronization reference source; or a sequence set of the second synchronization signal includes at least two sequence subsets, and at least one of the at least two sequence subsets indicates the type of the synchronization reference source; or the second synchronization signal includes a third symbol and a fourth symbol, and at least one combination of a sequence used by the third symbol or a sequence used by the fourth symbol indicates the type of the synchronization reference source; or the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

In some embodiments, the sending unit 1220 is further configured to send control information, where the sequence of the first synchronization signal and/or the sequence of the second synchronization signal, and the control information are used to indicate the type of the synchronization reference source.

In some embodiments, the sending unit 1220 is further configured to send control information, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

It should be understood that the user equipment 1200 according to this embodiment of the present invention may be corresponding to the user equipment in the synchronization method 900 according to the embodiment of the present invention. In addition, the foregoing and other operations and/or functions of the units/modules in the user equipment 1200 are intended to implement corresponding procedures of the method 900 in FIG. 9. For brevity, details are not described herein again.

In this embodiment of the present invention, when the type of the synchronization reference source of the UE is any one of the GNSS, the base station, or the UE, the synchronization signal sent by the user equipment can indicate the type of the synchronization reference source, so that another user equipment can determine the type of the synchronization reference source according to the synchronization signal. In this way, synchronization can be implemented, and optimum communication performance is ensured.

Figure 13:
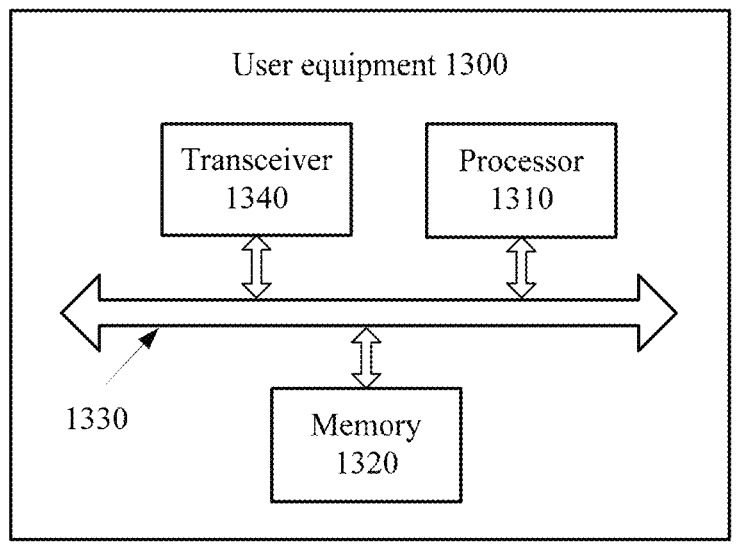
FIG. 13 is a schematic block diagram of user equipment according to another embodiment of the present invention.

FIG. 13 is a schematic block diagram of user equipment 1300 according to another embodiment of the present invention. As shown in FIG. 13, the user equipment 1300 includes a processor 1310, a memory 1320, a bus system 1330, and a transceiver 1340. The processor 1310, the memory 1320, and the transceiver 1340 are connected by using the bus system 1330, the memory 1320 is configured to store an instruction, and the processor 1310 is configured to execute the instruction stored in the memory 1320.

The processor 1310 is configured to obtain synchronization information, where the synchronization information includes at least one of the following information: synchronization source selection parameter information, synchronization source indication information, or synchronization source priority information.

The transceiver 1340 is configured to receive a first synchronization signal sent by at least one synchronization source.

The processor 1310 is further configured to determine a synchronization reference source according to the synchronization information and the first synchronization signal.

In this embodiment of the present invention, the synchronization information is obtained, and the synchronization reference source is determined according to the synchronization information and the synchronization signal sent by the at least one synchronization source, so that synchronization can be implemented.

It should be understood that, in this embodiment of the present invention, the processor 1310 may be a central processing unit (CPU), or the processor 1310 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

The memory 1320 may include a read-only memory and a random access memory, and provide an instruction and data for the processor 1310. A part of the memory 1320 may further include a non-volatile random access memory. For example, the memory 1320 may further store device type information.

In addition to a data bus, the bus system 1330 may include a power bus, a control bus, a status signal bus, and the like. However, for clear description, various types of buses in the figure are marked as the bus system 1330.

In an implementation process, steps in the foregoing methods can be implemented by using a hardware integrated logical circuit in the processor 1310, or by using instructions in a form of software. The steps in the method disclosed with reference to the embodiments of the present invention may be directly performed by a hardware processor, or may be performed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory 1320, and the processor 1310 reads information from the memory 1320, and completes the steps in the foregoing methods in combination with hardware in the processor. To avoid repetition, details are not described herein again.

In some embodiments, the transceiver 1340 is further configured to receive synchronization information sent by a base station. Accordingly, the processor 1310 obtains the synchronization information from the transceiver 1340.

In some embodiments, the processor 1310 is specifically configured to select, from the at least one synchronization source, a synchronization source that satisfies the selection parameter as the synchronization reference source according to the first synchronization signal.

In some embodiments, the synchronization source indication information indicates a first synchronization source, and the processor 1310 is specifically configured to select the first synchronization source as the synchronization reference source according to the first synchronization signal.

In some embodiments, the processor 1310 is specifically configured to select, from the at least one synchronization source, a synchronization source with a highest priority as the synchronization reference source according to the priority information and the first synchronization signal.

In some embodiments, the synchronization source indication information indicates a first synchronization source.

Accordingly, the processor 1310 is specifically configured to:

determine, according to the first synchronization signal, that the at least one synchronization source includes the first synchronization source; and if the first synchronization source satisfies a predefined condition, select the first synchronization source as the synchronization reference source; or if a signal of the first synchronization source does not satisfy a predefined condition, select, from the at least one synchronization source except the first synchronization source, a second synchronization source with a highest priority as the synchronization reference source according to the priority information.

In some embodiments, the first synchronization signal includes a second synchronization signal and/or a third synchronization signal, and the processor 1310 is specifically configured to:

determine a type of the at least one synchronization source according to a sequence of the second synchronization signal and/or a sequence of the third synchronization signal; and select the synchronization reference source according to the synchronization information and the type of the at least one synchronization source.

A first sequence, a second sequence, and a third sequence of the second synchronization signal are used to indicate different synchronization source types, and the first sequence, the second sequence, and the third sequence are different from each other; or the second synchronization signal occupies a first symbol and a second symbol, and multiple combinations of a sequence used by the first symbol or a sequence used by the second symbol are used to indicate different synchronization source types; or a sequence set of the third synchronization signal includes multiple sequence subsets, and the multiple sequence subsets are used to indicate different synchronization source types; or the third synchronization signal occupies a third symbol and a fourth symbol, and multiple combinations of a sequence used by the third symbol or a sequence used by the fourth symbol are used to indicate different synchronization source types; or the second synchronization signal occupies a first symbol and a second symbol, the third synchronization signal occupies a third symbol and a fourth symbol, and multiple combinations of a sequence used by the first symbol, a sequence used by the second symbol, a sequence used by the third symbol, or a sequence used by the fourth symbol are used to indicate different synchronization source types.

In some embodiments, the transceiver 1340 is further configured to receive first control information sent by the at least one synchronization source.

Accordingly, the processor 1310 is specifically configured to:

determine a type of the at least one synchronization source according to the first control information; and determine the synchronization reference source according to the synchronization information, the first synchronization signal, and the type of the at least one synchronization source.

In some embodiments, the transceiver 1340 is further configured to receive first control information sent by the at least one synchronization source, where the first control information includes at least one of the following information: auxiliary indication information of a synchronization source type, indication information of a synchronization signal sending cycle, indication information indicating whether a synchronization signal is sent, indication information indicating whether a synchronization signal is valid, indication information of a time-frequency location at which a synchronization signal is sent, or indication information of a hop count of a synchronization source.

In some embodiments, the first synchronization signal includes a second synchronization signal and/or a third synchronization signal, and the processor 1310 is specifically configured to determine the type of the at least one synchronization source according to a sequence of the second synchronization signal and/or a sequence of the third synchronization signal, and the first control information.

In some embodiments, the transceiver 1340 is further configured to: before receiving the synchronization information, send information about the at least one synchronization source to the base station, so that the base station determines the synchronization information according to the information about the at least one synchronization source.

In some embodiments, the transceiver 1340 is further configured to send a fourth synchronization signal and/or second control information according to the synchronization reference source, where the fourth synchronization signal and/or the second control information are/indicates a type of the synchronization reference source.

In some embodiments, the processor 1310 is further configured to determine a timing offset between a timing reference of the synchronization reference source and a timing reference of a synchronization reference source in another link; and the transceiver 1340 is further configured to perform communication according to the timing reference of the synchronization reference source and the timing offset determined by the processor 1310.

In some embodiments, the transceiver 1340 is further configured to receive timing offset indication information sent by the base station, where the timing offset indication indicates the timing offset; and the processor 1310 is specifically configured to determine the timing offset according to the timing offset indication information received by the transceiver 1340.

In some embodiments, the processor 1310 is further configured to obtain the timing reference of the synchronization reference source in the another link; and the processor 1310 is specifically configured to determine the timing offset according to the timing reference of the synchronization reference source and the timing reference of the synchronization reference source in the another link.

It should be understood that the user equipment 1300 according to this embodiment of the present invention may be corresponding to the user equipment in the synchronization method 300 according to the embodiment of the present invention and the user equipment 1000 according to the embodiment of the present invention. In addition, the foregoing and other operations and/or functions of the units/modules in the user equipment 1300 are intended to implement corresponding procedures of the method 300 in FIG. 3. For brevity, details are not described herein again.

In this embodiment of the present invention, the synchronization information is obtained, and the synchronization reference source is determined according to the synchronization information and the synchronization signal of the at least one synchronization source, so that synchronization can be implemented.

Figure 14:
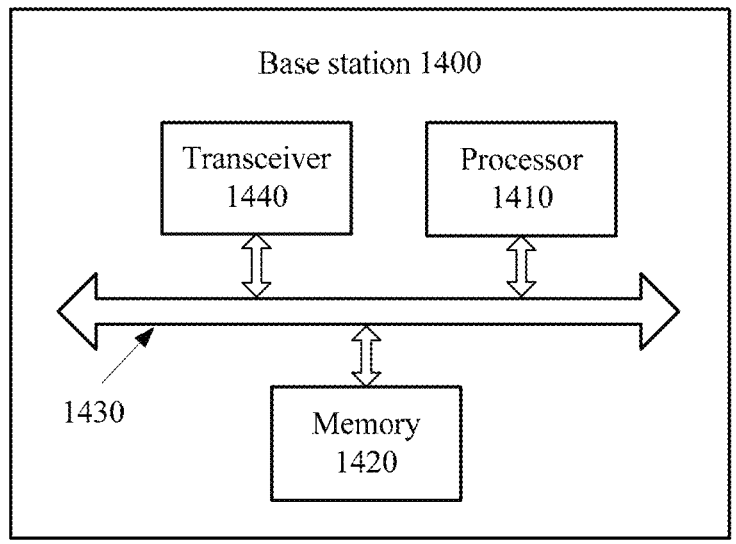
FIG. 14 is a schematic block diagram of a base station according to another embodiment of the present invention.

FIG. 14 is a schematic block diagram of a base station 1400 according to another embodiment of the present invention. As shown in FIG. 14, the base station 1400 includes a processor 1410, a memory 1420, a bus system 1430, and a transceiver 1440. The processor 1410, the memory 1420, and the transceiver 1440 are connected by using the bus system 1430, the memory 1420 is configured to store an instruction, and the processor 1410 is configured to execute the instruction stored in the memory 1420.

The processor 1410 is configured to determine synchronization information, where the synchronization information includes at least one of the following information: synchronization source selection parameter information, synchronization source indication information, or synchronization source priority information.

The transceiver 1440 is configured to send the synchronization information to user equipment.

In this embodiment of the present invention, the synchronization information is sent to the user equipment, so that the user equipment can determine a synchronization reference source according to the synchronization information. In this way, synchronization can be implemented, and optimum communication performance is ensured.

It should be understood that, in this embodiment of the present invention, the processor 1410 may be a CPU, or the processor 1410 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1420 may include a read-only memory and a random access memory, and provide an instruction and data for the processor 1410. A part of the memory 1420 may further include a non-volatile random access memory. For example, the memory 1420 may further store device type information.

In addition to a data bus, the bus system 1430 may include a power bus, a control bus, a status signal bus, and the like. However, for clear description, various types of buses in the figure are marked as the bus system 1430.

In an implementation process, steps in the foregoing methods can be implemented by using a hardware integrated logical circuit in the processor 1410, or by using instructions in a form of software. The steps in the method disclosed with reference to the embodiments of the present invention may be directly performed by a hardware processor, or may be performed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory 1420, and the processor 1410 reads information from the memory 1420 and completes the steps in the foregoing methods in combination with hardware in the processor. To avoid repetition, details are not described herein again.

In some embodiments, the transceiver 1440 is further configured to send control information to the user equipment, where the control information indicates a type and/or an identifier of a synchronization reference source.

In some embodiments, the transceiver 1440 is further configured to send control information to the user equipment, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

In some embodiments, the transceiver 1440 is further configured to: before sending the synchronization information to the user equipment, receive information about at least one synchronization source, where the information is sent by the user equipment; and the processor 1410 is configured to determine the synchronization information according to the information about the at least one synchronization source received by the transceiver 1440.

In some embodiments, the transceiver 1440 is further configured to send timing offset indication information to the user equipment, where the timing offset indication information indicates a timing offset between a timing reference of the synchronization reference source of the user equipment and a timing reference of a synchronization reference source in another link.

It should be understood that the base station 1400 according to this embodiment of the present invention may be corresponding to the base station in the synchronization method 800 according to the embodiment of the present invention and the base station 1100 according to the embodiment of the present invention. In addition, the foregoing and other operations and/or functions of the units/modules in the base station 1400 are intended to implement corresponding procedures of the method 800 in FIG. 8. For brevity, details are not described herein again.

In this embodiment of the present invention, the synchronization information is sent to the user equipment, so that the user equipment can determine the synchronization reference source according to the synchronization information. In this way, synchronization can be implemented, and optimum communication performance is ensured.

Figure 15:
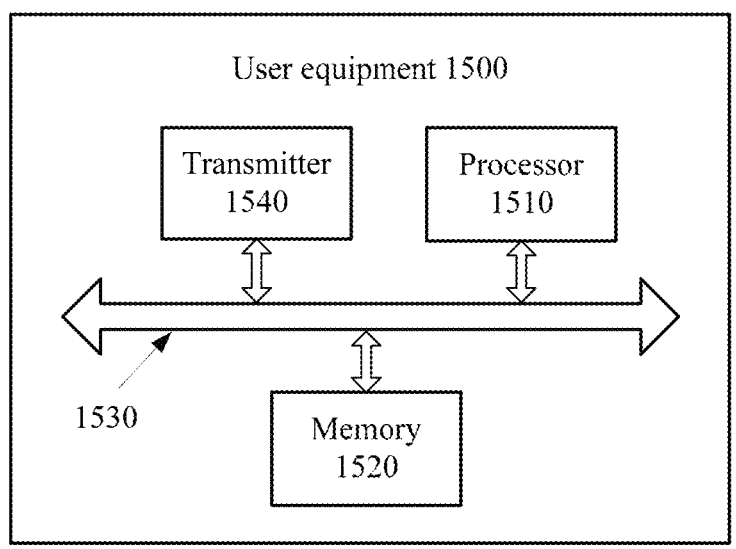
FIG. 15 is a schematic block diagram of user equipment according to another embodiment of the present invention.

FIG. 15 is a schematic block diagram of user equipment 1500 according to another embodiment of the present invention. As shown in FIG. 15, the user equipment 1500 includes a processor 1510, a memory 1520, a bus system 1530, and a transmitter 1540. The processor 1510, the memory 1520, and the transmitter 1540 are connected by using the bus system 1530, the memory 1520 is configured to store an instruction, and the processor 1510 is configured to execute the instruction stored in the memory 1520.

The processor 1510 is configured to determine a synchronization reference source, where a type of the synchronization reference source is any one of a global navigation satellite system, a base station, or user equipment.

The transmitter 1540 is configured to send a synchronization signal according to the synchronization reference source, where the synchronization signal includes a first synchronization signal and/or a second synchronization signal, and a sequence of the first synchronization signal and/or a sequence of the second synchronization signal are/indicates the type of the synchronization reference source.

In this embodiment of the present invention, when the type of the synchronization reference source of the UE is any one of the GNSS, the base station, or the UE, the synchronization signal sent by the user equipment can indicate the type of the synchronization reference source, so that another user equipment can determine the type of the synchronization reference source according to the synchronization signal. In this way, synchronization can be implemented, and optimum communication performance is ensured.

It should be understood that, in this embodiment of the present invention, the processor 1510 may be a CPU, or the processor 1510 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1520 may include a read-only memory and a random access memory, and provide an instruction and data for the processor 1510. A part of the memory 1520 may further include a non-volatile random access memory. For example, the memory 1520 may further store device type information.

In addition to a data bus, the bus system 1530 may include a power bus, a control bus, a status signal bus, and the like. However, for clear description, various types of buses in the figure are marked as the bus system 1530.

In an implementation process, steps in the foregoing methods can be implemented by using a hardware integrated logical circuit in the processor 1510, or by using instructions in a form of software. The steps in the method disclosed with reference to the embodiments of the present invention may be directly performed by a hardware processor, or may be performed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory 1520, and the processor 1510 reads information from the memory 1520 and completes the steps in the foregoing methods in combination with hardware in the processor. To avoid repetition, details are not described herein again.

At least one sequence of the first synchronization signal indicates the type of the synchronization reference source; or the first synchronization signal occupies a first symbol and a second symbol, and at least one combination of a sequence used by the first symbol or a sequence used by the second symbol indicates the type of the synchronization reference source; or a sequence set of the second synchronization signal includes at least two sequence subsets, and at least one of the at least two sequence subsets indicates the type of the synchronization reference source; or the second synchronization signal includes a third symbol and a fourth symbol, and at least one combination of a sequence used by the third symbol or a sequence used by the fourth symbol indicates the type of the synchronization reference source; or the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

In some embodiments, the transmitter 1540 is further configured to send control information, where the sequence of the first synchronization signal and/or the sequence of the second synchronization signal, and the control information are used to indicate the type of the synchronization reference source.

In some embodiments, the transmitter 1540 is further configured to send control information, where the control information includes at least one of the following information: auxiliary indication information of a synchronization source type, indication information of a synchronization signal sending cycle, indication information indicating whether a synchronization signal is valid, indication information indicating whether a synchronization signal is sent, indication information of a time-frequency location at which a synchronization signal is sent, or indication information of a hop count of a synchronization source.

It should be understood that the user equipment 1500 according to this embodiment of the present invention may be corresponding to the user equipment in the synchronization method 900 according to the embodiment of the present invention and the user equipment 1200 according to the embodiment of the present invention. In addition, the foregoing and other operations and/or functions of the units/modules in the user equipment 1500 are intended to implement corresponding procedures of the method 900 in FIG. 9. For brevity, details are not described herein again.

In this embodiment of the present invention, when the type of the synchronization reference source of the UE is any one of the GNSS, the base station, or the UE, the synchronization signal sent by the user equipment can indicate the type of the synchronization reference source, so that another user equipment can determine the type of the synchronization reference source according to the synchronization signal. In this way, synchronization can be implemented, and optimum communication performance is ensured.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio and microwave are included in a definition of a medium to which they belong. For example, a disk and a disc used in the present invention includes a compact disc (CD), a laser disc, an optical disc, a digital versatile disc (DVD), a floppy disk, and a Blu-ray disc. The disk generally copies data by using a magnetic means, and the disc copies data optically by using a laser. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
   obtaining synchronization information, wherein the synchronization information indicates global navigation satellite system (GNSS) as a synchronization source with a highest priority;
   selecting the GNSS as a synchronization reference source if the GNSS satisfies a predefined condition;
   determining timing offset indication information, wherein the timing offset indication information indicates a timing offset between the synchronization reference source and a device-to-device (D2D) link; and
   performing communication according to a timing reference of the synchronization reference source and the timing offset.

2. The method according to claim 1, wherein performing the communication according to the timing reference of the synchronization reference source and the timing offset comprises:
   determining a subframe number of the D2D link according to the timing reference of the synchronization reference source and the timing offset.

3. The method according to claim 1, wherein if the GNSS does not satisfy the predefined condition, selecting, except the GNSS, a synchronization source with a highest priority as the synchronization reference source according to priority.

4. The method according to claim 1, wherein obtaining the synchronization information comprises:
   receiving the synchronization information from a base station.

5. The method according to claim 1, wherein determining the timing offset indication information comprises:
   receiving the timing offset indication information from a base station.

6. The method according to claim 1, further comprising:
   sending a synchronization signal according to the synchronization reference source, wherein the synchronization signal comprises a first synchronization signal or a second synchronization signal, a sequence of the first synchronization signal or a sequence of the second synchronization signal indicating a type of the synchronization reference source.

7. The method according to claim 6, wherein
   at least one sequence of the first synchronization signal indicates the type of the synchronization reference source;
   the first synchronization signal occupies a first symbol and a second symbol, and at least one combination of a sequence used by the first symbol or a sequence used by the second symbol indicates the type of the synchronization reference source;
   a sequence set of the second synchronization signal comprises at least two sequence subsets, and at least one of the at least two sequence subsets indicate the type of the synchronization reference source;
   the second synchronization signal comprises a third symbol and a fourth symbol, and at least one combination of a sequence used by the third symbol or a sequence used by the fourth symbol indicates the type of the synchronization reference source; or
   the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

8. An apparatus, comprising:
   a non-transitory memory storage comprising instructions; and
   one or more processors in communication with the memory storage, wherein the one or more processors execute the instructions to:

obtain synchronization information, wherein the synchronization information indicates global navigation satellite system (GNSS) as a synchronization source with a highest priority;

select the GNSS as a synchronization reference source if the GNSS satisfies a predefined condition;

determine timing offset indication information, wherein the timing offset indication information indicates a timing offset between the synchronization reference and a device-to-device (D2D) link; and perform communication according to a timing reference of the synchronization reference source and the timing offset.

9. The apparatus according to claim 8, wherein the one or more processors execute the instructions to determine a subframe number of the D2D link according to the timing reference of the synchronization reference source and the timing offset.

10. The apparatus according to claim 8, wherein if the GNSS does not satisfy the predefined condition, the one or more processors execute the instructions to select, except the GNSS, a synchronization source with a highest priority as the synchronization reference source according to priority.

11. The apparatus according to claim 8, wherein the one or more processors execute the instructions to receive the synchronization information from a base station.

12. The apparatus according to claim 8, wherein the one or more processors execute the instructions to receive timing offset indication information from a base station.

13. The apparatus according to claim 8, wherein the one or more processors execute the instructions to send a synchronization signal according to the synchronization reference source, wherein the synchronization signal comprises a first synchronization signal or a second synchronization signal, and a sequence of the first synchronization signal or a sequence of the second synchronization signal indicates/indicate a type of the synchronization reference source.

14. The apparatus according to claim 13, wherein
at least one sequence of the first synchronization signal indicates the type of the synchronization reference source;
the first synchronization signal occupies a first symbol and a second symbol, and at least one combination of a sequence used by the first symbol or a sequence used by the second symbol indicates the type of the synchronization reference source; or
a sequence set of the second synchronization signal comprises at least two sequence subsets, and at least one of the at least two sequence subsets indicates the type of the synchronization reference source;
the second synchronization signal comprises a third symbol and a fourth symbol, and at least one combination of a sequence used by the third symbol or a sequence used by the fourth symbol indicates the type of the synchronization reference source; or
the first synchronization signal occupies a first symbol and a second symbol, the second synchronization signal occupies a third symbol and a fourth symbol, and at least one combination of a sequence used by the first symbol, a sequence used by the second symbol, a sequence used by the third symbol, or a sequence used by the fourth symbol indicates the type of the synchronization reference source.

15. An apparatus, comprising:
a non-transitory memory storage comprising instructions; and
one or more processors in communication with the memory storage, wherein the one or more processors execute the instructions to:
determine synchronization information, wherein the synchronization information indicates global navigation satellite system (GNSS) as a synchronization source with a highest priority; and
send the synchronization information to user equipment;
send timing offset indication information to the user equipment, wherein the timing offset indication information indicates a timing offset between the synchronization reference source and a device-to-device (D2D) link.

16. A non-transitory computer-readable storage medium comprising instructions which, when executed by at least one processor, cause the at least one processor to:
obtain synchronization information, wherein the synchronization information indicates global navigation satellite system (GNSS) as a synchronization source with a highest priority;
select the GNSS as a synchronization reference source if the GNSS satisfies a predefined condition;
determine timing offset indication information, wherein the timing offset indication information indicates a timing offset between the synchronization reference source and a device-to-device (D2D) link; and
perform communication according to a timing reference of the synchronization reference source and the timing offset.

17. The non-transitory computer-readable storage medium according to claim 16, wherein the instructions further executed by the at least one processor to send a synchronization signal according to the synchronization reference source, wherein the synchronization signal comprises a first synchronization signal or a second synchronization signal, a sequence of the first synchronization signal or a sequence of the second synchronization signal indicating a type of the synchronization reference source.

18. The non-transitory computer-readable storage medium according to claim 16, wherein the instructions executed by the at least one processor to determine a subframe number of the D2D link according to the timing reference of the synchronization reference source and the timing offset.

19. The non-transitory computer-readable storage medium according to claim 16, wherein the instructions executed by at least one processor to receive the timing offset indication information from a base station.

* * * * *